US011989776B1

(12) United States Patent
Hepp et al.

(10) Patent No.: US 11,989,776 B1
(45) Date of Patent: May 21, 2024

(54) REAL ESTATE FINANCE EXCHANGE

(71) Applicant: CGI Technologies and Solutions Inc., Fairfax, VA (US)

(72) Inventors: Brian Lee Hepp, Broadlands, VA (US); Karun Khanna, Leesburg, VA (US); Upendra Narayan Agashe, Chantilly, VA (US); Rohith Gorur, Ashburn, VA (US); Debajyoti Bhattacharyya, Herndon, VA (US); William Jeffrey Adams, Avon, OH (US); Ryan A. McElroy, Pittsburg, PA (US)

(73) Assignee: CGI Technologies and Solutions Inc., Fairfax, VA (US)

( * ) Notice: Subject to any disclaimer, the term of this patent is extended or adjusted under 35 U.S.C. 154(b) by 0 days.

(21) Appl. No.: 17/502,994

(22) Filed: Oct. 15, 2021

Related U.S. Application Data

(60) Provisional application No. 63/093,058, filed on Oct. 16, 2020.

(51) Int. Cl.
*G06Q 40/00* (2023.01)
*G06Q 30/018* (2023.01)
*G06Q 30/02* (2023.01)
*G06Q 40/03* (2023.01)

(52) U.S. Cl.
CPC ........... *G06Q 40/03* (2023.01); *G06Q 30/018* (2013.01); *G06Q 30/0278* (2013.01)

(58) Field of Classification Search
CPC ........ G06Q 40/03; G06Q 30/01; G06Q 30/02; G06Q 30/018; G06Q 30/0278

USPC .................................................. 705/4, 35–45
See application file for complete search history.

(56) References Cited

U.S. PATENT DOCUMENTS

| | | | |
|---|---|---|---|
| 9,892,460 B1 * | 2/2018 | Winklevoss | G06Q 40/04 |
| 11,200,569 B1 * | 12/2021 | James | G06Q 40/04 |
| 2017/0060600 A1 * | 3/2017 | Niehaus | G06F 9/453 |
| 2020/0226675 A1 * | 7/2020 | Mitra | G06Q 30/08 |

\* cited by examiner

*Primary Examiner* — Eric T Wong
*Assistant Examiner* — Mohammed H Mustafa
(74) *Attorney, Agent, or Firm* — McDermott Will & Emery LLP

(57) ABSTRACT

A method for asset evaluation and funding includes receiving, in a server, a request from a client device to access a digital item associated with an asset. The method also includes collecting a personal information of a user associated with the asset, assessing a status of the user based on the personal information, and collecting a historical information associated with similar users and similar assets. The method includes searching for values of the asset in a network, determining attributes of the digital item based on the value of the asset, the status of the user, and the historical information, and generating documents for the user, wherein collecting a personal information associated with the user comprises searching for a first information from a third party database, and requesting a second information from the user. A system and a non-transitory, computer-readable medium storing instruction to perform the above method are also provided.

15 Claims, 41 Drawing Sheets

451 → ITEM FIRST  ITEM TWO  ITEM THREE  ITEM FOUR  ITEM FIVE    420 ⌢ 👥 ⚙ 🔔 (⊙)

APPROVAL STAGE

| HIGH PRIORITY EXCEPTIONS ○ | MEDIUM PRIORITY EXCEPTIONS ⊕ | LOW PRIORITY EXCEPTIONS ○ | NORMAL ○ |
|---|---|---|---|
| Rejected by Investor | Manual Validation Needed | Credit Inquiries | |
| 410-1 | 410-2 | 410-3 | 410-4 |
| 10% 450 | 8% 550 | 2% 475 | 80% 2,000 |
| VIEW LIST | VIEW LIST | VIEW LIST | VIEW LIST |

LOANS  [Search 🔍]   Filter by:

| 425-1 Priority Status | 425-2 Loan ID | 425-3 Name | 425-4 Amount | 425-5 Details |
|---|---|---|---|---|
| [HIGH] | XXXXXXXX | Large | 000.00 | VIEW DETAILS |

Description:
Lorem ipsum dolor sit amet, consectetur adipiscing elit, sed do eiusmod tempor incididunt ut labore et dolore magna aliqua. 430
ut enim ad minim veniam, quis.   Problem Tag: (INSUFFICIENT INCOME) (LOW CREDIT SCORE) (INSUFFICIENT ASSETS)

| △ [HIGH] | XXXXXXXX | Large | 000.00 | VIEW DETAILS |
| △ [MEDIUM] | XXXXXXXX | Large | 000.00 | VIEW DETAILS |
| △ [LOW] | XXXXXXXX | Large | 000.00 | VIEW DETAILS |

FIG. 4

Company A is operating at an inefficient return rate. In order to increase Appraisal turn around, the distribution model must be adjusted.

- ⊖ Company A    38% on Target
- ⊘ Company B    79% on Target
- ⊗ Company C    90% on Target

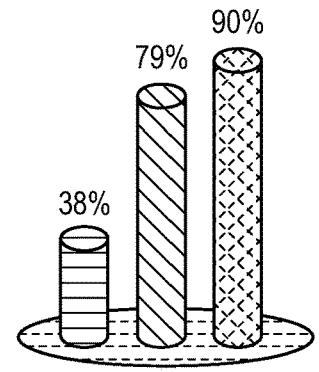

561-1

TRENDS

Based on Appraisal patterns over the past six months, Company A has a slower return rate than Company B and Company C when assessing properties in these zip codes: 11111, 22222, 33333.

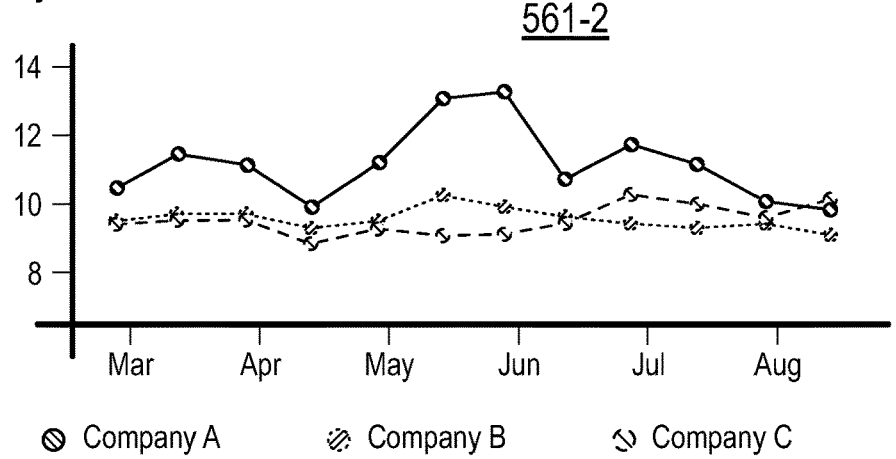

FIG. 5C

☑ Apply Custom Optimization

<u>561-3</u>

SUGGESTION

Redistribute Property Appraisals for zip codes 11111, 22222, and 33333, to Company B and C Zip 11111   Current ⊖ Company A    ⊘ Company B    ⊗ Company C

[  ] %    [  ] %    [  ] %

<u>562C</u>

Zip 22222     56%    44%

Zip 33333     52%    48%

PROJECTION

% Appraisals on Target

563

Goal : 85%
65%
45%
25%

Today  Week 1  Week 2  Week 3  Week 4

565

Cancel    Submit Changes

FIG. 5C (Continued)

Loans
Notes (8/16):
Status instead of "Stage"
- # loans received
- # MISMO failure
- # Data Validation in-progress
- # Data Validation complete Stage One: PROCESSOR REVIEW — 32 (630-1)
Stage Two: US REVIEW & CONDITIONS — 15 (630-2)
Stage Three: UNDERWRITER REVIEW — 12 (630-3)
Stage Four: CONDITION SATISFACTION — 18 (630-4)

625

[Edit]

| NAME | PRIORITY STATUS | TASKS | DESCRIPTION | DATE ASSIGNED | DUE DATE | STAGE | DETAILS |
|---|---|---|---|---|---|---|---|
| Stout, Mildred | HIGH !!! | 19 Conditions | Lorem ipsum dolor sit amet, consectetuer adipiscing elit, sed diam | 2/25/21 | 3/11/21 | Four | △ |
| Clearwater, Eliza | HIGH !!! | 14 Conditions | Lorem ipsum dolor sit amet, consectetuer adipiscing elit, sed diam | 2/25/21 | 3/11/21 | Four | △ |
| Moure, Tessa | HIGH !!! | 11 Conditions | Lorem ipsum dolor sit amet, consectetuer adipiscing elit, sed diam | 3/05/21 | 3/19/21 | Two | △ |
| Sullivan, Lee | HIGH !!! | 11 Exceptions | EXAMPLE: Conventional ; $76, 000.00 | 3/09/21 | 3/23/21 | One | △ |
| Yates, Chris | MEDIUM !! | 8 Conditions | Lorem ipsum dolor sit amet, consectetuer adipiscing elit, sed diam | 3/04/21 | 3/18/21 | Three | △ |
| Padilla, Musa | MEDIUM !! | 3 Exceptions | Lorem ipsum dolor sit amet, consectetuer adipiscing elit, sed diam | 3/09/21 | 3/23/21 | One | △ |
| Crawford, Casey | LOW = | 15 Conditions | Lorem ipsum dolor sit amet, consectetuer adipiscing elit, sed diam | 2/26/21 | 3/14/21 | Four | △ |
| Caldwell, Josie | LOW = | 28 Conditions | Lorem ipsum dolor sit amet, consectetuer adipiscing elit, sed diam | 3/01/21 | 3/15/21 | Four | △ |
| Ramos, Tony | LOW = | 25 Conditions | Lorem ipsum dolor sit amet, consectetuer adipiscing elit, sed diam | 3/04/21 | 3/18/21 | Three | △ |
| Li, Wayne | LOW = | 8 Conditions | Lorem ipsum dolor sit amet, consectetuer adipiscing elit, sed diam | 3/04/21 | 3/18/21 | Three | △ |
| Hubbard, Richard | LOW = | 12 Conditions | Lorem ipsum dolor sit amet, consectetuer adipiscing elit, sed diam | 3/08/21 | 3/24/21 | Two | △ |
| Santos, Vicky | LOW = | 4 Exceptions | Lorem ipsum dolor sit amet, consectetuer adipiscing elit, sed diam | 3/17/21 | 4/01/21 | One | △ |

FIG. 6C

Details | OVERVIEW

651F →

Sullivan, Lee   LOAN ID#348589

- Assigned Processor: Jessica P.
- Assigned Underwriter: TBD
- Assigned Loan Officer: Rosetta L.
- Borrower One: Lee Sullivan

EXCEPTIONS (CLEARED)  CONDITIONS (0)

No Conditions Available
Conditions will be set after US submission and/or Underwriter Review.

641

PRIORITY: LOW

STATUS

PRIORITY: LOW   =
630-1  630-2 Stage 2

*Underwriter System is reviewing the application & writing conditions.*

643

WHAT'S NEXT?

US is currently reviewing the application. In the meantime you can request an Underwriter. (Note: An underwriter will be automatically assigned after US review completes)  [Request]

620

621F

WHAT'S YOUR TIMELINE?
This is a timeline to help keep your loans on track and make sure things are moving through the stages efficiently.

645 →

| 3/10 | 3/11 | 3/12 | 3/16 | 3/18 | 3/22 |
| 630-1 | | 630-2 | 630-3 | 630-4 | |
| Application Received | Stage 1 Status | Stage 2 Status | Stage 3 Status | Stage 4 Status | |

○ You are Here

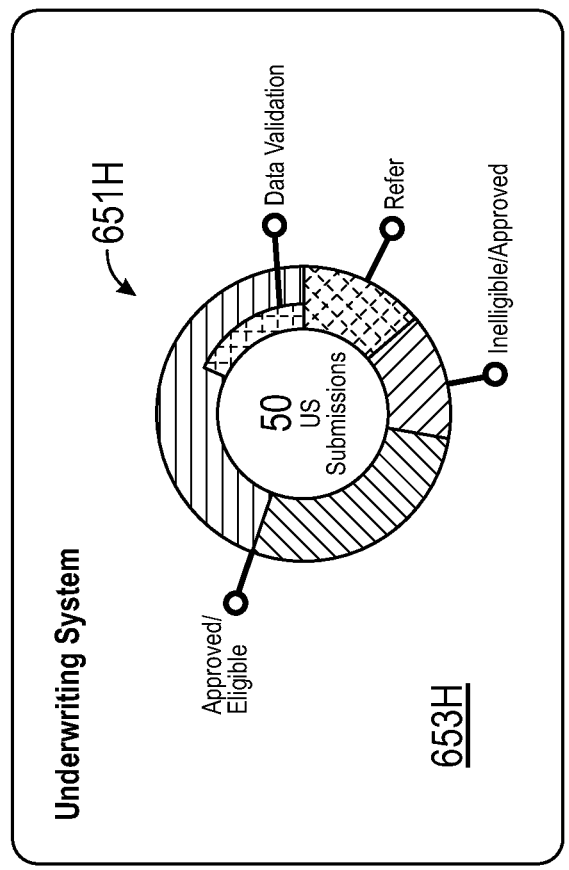
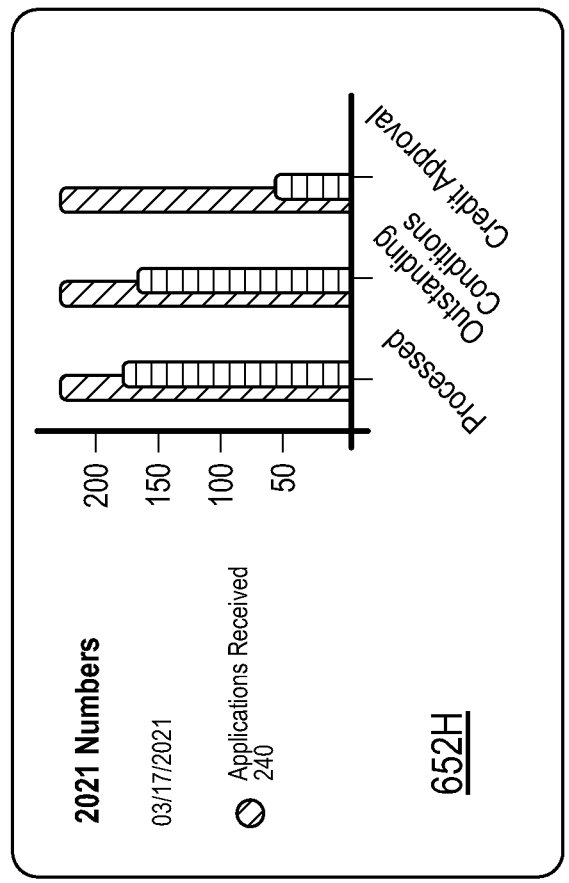
FIG. 6H

651J

< Details | Conditions

| ▽ Filter | ▽ | Search | 🔍 | ≣ 𝄙 |

| | NAME | CONDITION | RESOLUTION | DATE ADDED | DATE DUE | STATUS |
|---|---|---|---|---|---|---|
| ☐ ☐ | Employment | Verbal Confirmation of employment eith employer 10 days before closing | (Request) | | 3/23/21 | |
| ⊘ ☐ | Income | Unable to validate bonus income through US Validation Service: Must validate manually | (Request) | 3/17/21 | 3/23/21 | |
| ⊘ ☐ | Assets | Validated assets required to close through US Validation Service: Must validate source of large b.... | Sources of large bank deposits: _____ & _____ | 3/16/21 | 3/23/21 | Pending |
| ☐ ☐ | Credit & Liabilities | Letter of explanation required from borrower on two credit inquiries in last 90 days. | Letter of explanation: two credit inquiries explained | 3/16/21 | 3/23/21 | Approved |

< Details | Conditions

Filter ▽

Search 🔍

Unresolved Conditions

Employment
Verbal Confirmation
Needed
Due: 3/23/21
(Request)

Income
Validate Bonus
Income
Due: 3/23/21
(Request)

660-1

SHOW ALL

Pending Approval

Assets
Bank Statement
Due: 3/23/21

660-2

SHOW ALL

Cleared Conditions

Credit &
Liabilities
Approved
Due: 3/23/21

660-3

SHOW ALL

< Details | History

| NAME | DATE | ACTION | COMMENTS/DESCRIPTION | STATUS |
|---|---|---|---|---|
| UW- Amirah Williams | 3/17/21 | New Condition(s) | 2 new condition(s) have been added to Application | |
| UW- Amirah Williams | 3/16/21 | New Condition(s) | 1 new condition(s) have been added to Application | |
| Auto | 3/12/21 | UW Assigned | Amirah Williams has been assigned as UW to review Loan #348589 | |
| PR- Jessica P. | 3/11/21 | UW Request | Jessica has submitted Exception for Underwriter review | |
| DU Auto | 3/11/21 | Application Reviewed | Complete application reviewed by US; 1 Condition set | |
| PR- Jessica P. | 3/11/21 | DU Submit | Application submitted to US | |
| PR- Jessica P. | 3/10/21 | Exceptions Cleared | All exceptions have been cleared | |
| Auto | 3/09/21 | Application Received | Application Received with 4 flagged exceptions | |

| Dashboard | Tasks ▾ | Task Calendar ▾ | Form Templates ▾ | Task Templates ▾ | Task Template Demo Inspection ▾ | Manage Reports ▾ | Users ▾ | User jadamsdemo ▾ | Change Password |
|---|---|---|---|---|---|---|---|---|---|
| | | | | | | | | | Edit Your Profile |
| | | | | | | | | | Logout |

User jadamsdemo                                                    ✖ CLOSE    💾 SAV User Information

User Name*
[jadamsdemo]

Email
[William.J.Adams@cgifederal.com]

First Name*
[Jeff]

Last Name*
[Adams]

Status
[Active]    [Make Inactive]

Time Zone*
[(UTC-05:00) Eastern Time (US & Canada)  ▾]

Change Password

Role Information

┌─────────────────────────────┐
│ ☑ Mobile User Manager       │
│ ☑ Mobile Users              │
│ ☐ Read Only         765     │
│ ☑ Target Editor             │
│ ☑ Template Editor           │
│ ☑ User Admin                │
└─────────────────────────────┘

| Dashboard | Tasks* | Task Calendar * | Task 1001 Lakeside Ave* |
| Task 1001 Lakeside Ave | 755H |

- ▣ Task
  - ☑ Inspection Info
  - ▣ Finalize Inspection
  - ▣ Noted Exceptions
  - ◫ Map

✖ CLOSE   ▣ SAVE   ✓ SAVE & CLOSE

Task Date
10/06/2021

Task Time
08:30AM

Status
Completed

Assigned User
Adams, Jeff

Target
1001 Lakeside Ave
Suite 800
Cleveland, OH 44114
2164166495

Language

Related Tasks
Task ID   Parent ID   Created Date

Linked Documents
Personnel injury policy and procedures docx

Report Email Logs
Report         Email                              Date
Task Detail By ID   jeff.adams@cgifedaral.com   10/06/2021

▸ Copy Task  — 771

[▸ View Report]  [▸ Email Report]
     775              777

Misc
Task ID: 9037
Task Template Name: Demo Inspection
Task Template ID: 5631
Target ID: 10627
Target Template ID: 6542 — 773

[▸ Export to Excel]

FIG. 7H

REAL ESTATE FINANCE EXCHANGE

CROSS-REFERENCE TO RELATED APPLICATIONS

The present disclosure is related and claims priority under 35 U.S.C. § 119(e) to U.S. Prov. Pat. Ser. No. 63/093,058, to Hepp, et al. filed on Oct. 16, 2020, entitled "HOUSING FINANCE EXCHANGE," the contents of which are hereby incorporated by reference in their entirety, for all purposes.

BACKGROUND

Field

The present disclosure is related to an operational engine supported by an interactive portal to facilitate the origination of mortgage loans by lenders on behalf of borrowers and delivery of mortgage assets by lenders to investors. More specifically, embodiments as disclosed herein provide a real estate finance exchange (Fx) platform for loan assessment, processing, and approval.

Related Art

Secondary markets purchase loans from primary markets originated by lenders to provide lenders a continuous flow of funds for new loans to be originated. Currently, however, this process is performed manually at almost every level, not only consuming large amounts of man-hour time in the collection, verification, and authentication of all documentation, but also making the entire process fraught with errors that need to be corrected at some point (unless they become fatal errors), at large cost of time and resources for the industry and all individuals involved in the process, including of course the borrowers, and real estate owners.

RELATED ART

The real estate finance ecosystem is plagued by high costs, redundant work, long cycle times to close a mortgage loan, and a tedious and frustrating customer experience. Financial Technology Companies (Fintechs) have focused on developing "point" solutions to improve customer experience and reduce costs, taking an application on the web and/or mobile device, facilitating eClosings, eDelivery, and the like. However, given the nature of the task, these attempts typically are able to handle only a part of the solution, often requiring complex interconnections between different components, leading to information loss, inaccuracies, and errors that involve correction and constant supervision with the consequent cost increases and unnecessary processing delays.

SUMMARY

In a first embodiment, a computer-implemented method, includes receiving, in a server, a request from a client device to access a digital item associated with an asset. The computer-implemented method also includes collecting a personal information of a user associated with the asset, assessing a status of the user based on the personal information, collecting a historical information associated with multiple similar users and multiple similar assets, searching for a value of the asset in a network, determining an attribute of the digital item based on the value of the asset, the status of the user, and the historical information, and generating a document for the user, wherein collecting a personal information associated with the user includes searching for a first user information from a third party database, and requesting a second user information from the user.

In a second embodiment, a system includes one or more processors and a memory storing instructions which, when executed by the one or more processors, cause the system to perform operations. The operations include to receive, in a server, a request from a client device to access a digital item associated with an asset, to collect a personal information of a user associated with the asset, and to assess a status of the user based on the personal information. The operations also include to collect a historical information associated with multiple similar users and multiple similar assets, to search for a value of the asset in a network, to determine an attribute of the digital item based on the value of the asset, the status of the user, and the historical information, and to generate a document for the user, wherein to collect a personal information associated with the user the one or more processors execute instructions to collect a first user information from a third party database, and to request a second user information from the user.

In a third embodiment, a computer-implemented method includes collecting, in a mobile device, a media file including information about a property. The computer-implemented method also includes adjusting a configuration of the mobile device based on the quality value of the media file, and transmitting, to a remote server, the media file via a network, wherein collecting the media file includes capturing a video of an interior portion or an exterior portion of the property.

In another embodiment, a system includes a first means to store instructions and a second means to execute the instructions to cause the system to perform a method, the method including receiving, in a server, a request from a client device to access a digital item associated with an asset. The method also includes collecting a personal information of a user associated with the asset, assessing a status of the user based on the personal information, collecting a historical information associated with multiple similar users and multiple similar assets, searching for a value of the asset in a network, determining an attribute of the digital item based on the value of the asset, the status of the user, and the historical information, and generating a document for the user, wherein collecting a personal information associated with the user includes searching for a first user information from a third party database, and requesting a second user information from the user.

In yet another embodiment, a non-transitory, computer-readable medium stores instructions which, when executed by a processor in a computer, cause the computer to perform a method, the method including receiving, in a server, a request from a client device to access a digital item associated with an asset. The method also includes collecting a personal information of a user associated with the asset, assessing a status of the user based on the personal information, collecting a historical information associated with multiple similar users and multiple similar assets, searching for a value of the asset in a network, determining an attribute of the digital item based on the value of the asset, the status of the user, and the historical information, and generating a document for the user, wherein collecting a personal information associated with the user includes searching for a first user information from a third party database, and requesting a second user information from the user.

BRIEF DESCRIPTION OF THE FIGURES

FIG. 4 illustrates a detail of the dashboard of FIG. 3, according to some embodiments.

FIGS. 5A-5C illustrate several screenshots of the dashboard of FIG. 3 as used by an administrator of a lender, according to some embodiments.

FIGS. 6A-6L illustrate several screenshots of the dashboard of FIG. 3, according to some embodiments.

FIGS. 7A-7J illustrate devices and screenshots for a mobile application in a virtual property inspection tool, according to some embodiments.

In the figures, elements having the same or similar reference numerals have the same or similar features, unless stated otherwise, explicitly.

DETAILED DESCRIPTION

Figure 1:
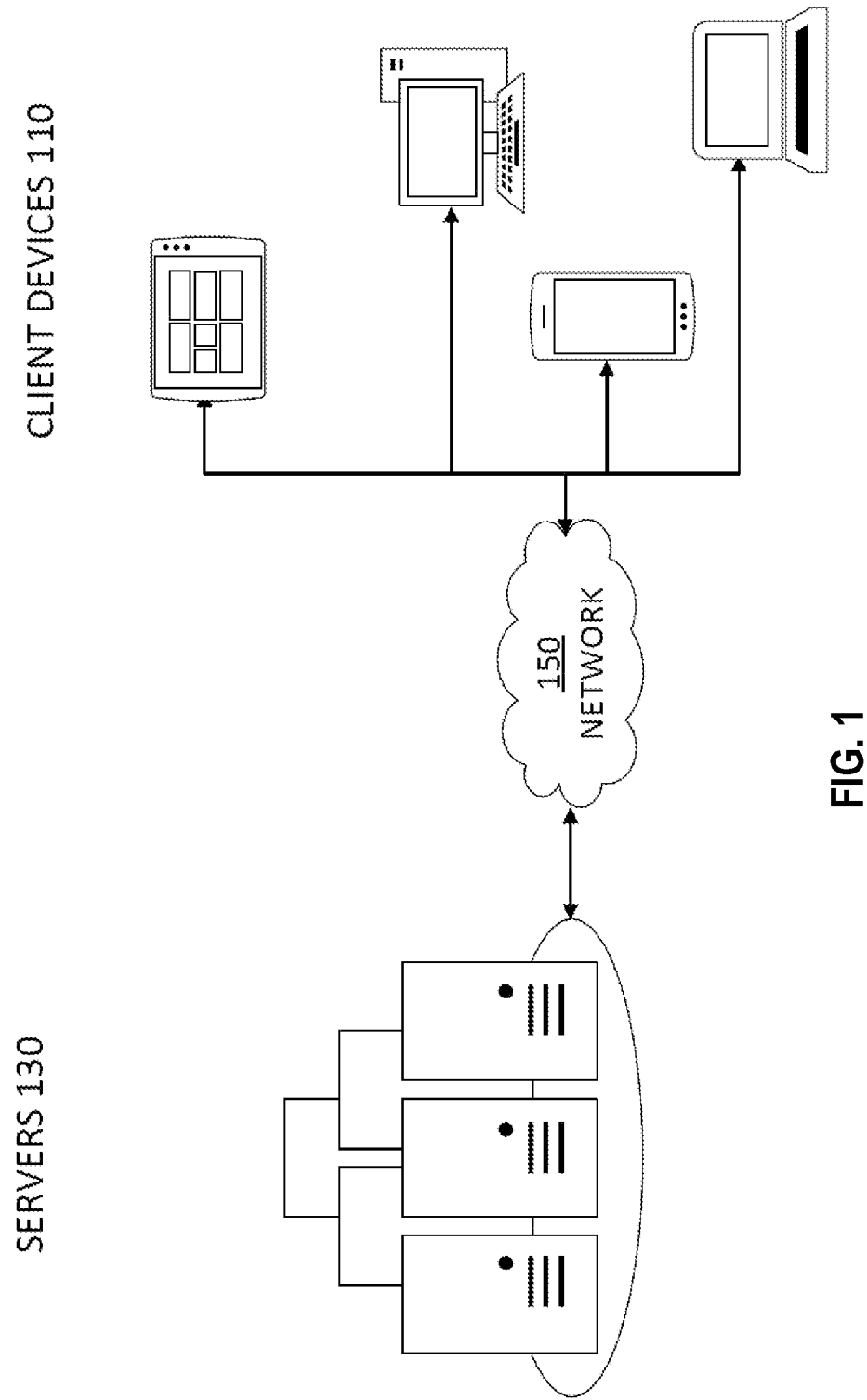
FIG. 1 illustrates an architecture for a real estate finance exchange system, according to some embodiments.

Some of the terminology that will be used in the present disclosure to describe different embodiments include:

Mortgage loan—associated with Borrower: a term used between Borrower and Lender and includes all documentation necessary to evaluate and process the loan.

Mortgage asset—after loan has been closed and funded: a term used between Lender and Investor; term used in relation to securitized asset.

An Fx platform as disclosed herein may reside on the cloud to provide a robust infrastructure to readily accommodate volume changes in the primary market and guideline changes in the secondary market. Embodiments as disclosed herein establish straight through processing, leveraging automation, machine learning, and artificial intelligence to underwrite borrower credit, assess a property value, clear a title document, generate and execute closing documents, and to deliver a loan to a secondary mortgage market.

An Fx platform as disclosed herein is embedded within a full ecosystem solution to tie the disparate "point" solutions together and provide solutions currently unavailable in the real estate finance industry. Delivering this holistic solution will have a dramatic impact on reducing costs and enhance the homebuyer/homeowner experience for a smooth, quick, and efficient process to get a new mortgage. The Fx platform solves the problem of long delays in mortgage processing, which usually takes several weeks, down to a few days, or even less by minimizing complexity, rework, waiting times, and over time utilizing analytics on the large datasets available in the platform to provide actionable operational insights to further improve operating efficiencies. Accordingly, the Fx platform as disclosed herein makes use of artificial intelligence, machine learning, and other data analytics techniques to gather and process large amounts of information in a centralized manner. Thus, methods and systems as disclosed herein provide mortgage processing and evaluation in a secured, fast, and reliable manner, benefiting borrowers, banks, and credit unions, and investors in mortgage assets. Banks and credit unions (lenders) will also have the ability to seamlessly deliver and fund the mortgage asset generated by Fx to secondary market investors. In some embodiments, a lender may have access to the Fx platform to have access to a mortgage loan for a borrower, and then offer and deliver the mortgage asset to secondary market investors, for example, including government sponsored enterprises (GSEs), private institutions, and the like. In some embodiments, a lender may have access to a mortgage loan for a borrower to review loan characteristics, performance against service level indicators, and overall cycle times to be able to be ready to close a loan with the borrower. Secondary market investors may benefit from an increased velocity to purchase loans, thus capturing revenue at a higher rate and reduced risk. Guarantors generally benefit from the increased operational efficiency of a platform as disclosed herein, as compared with current practices and techniques.

In some embodiments, the Fx portal is accessible to lenders and investors. In some embodiments, who benefit from Fx, may also have access to the Fx portal as disclosed herein, when a lender so desires.

Embodiments as disclosed herein substantially reduce the cost of mortgage loans by lenders not only due to the shorter time to process, evaluate, and execute the mortgage documents, but also because of the more holistic assessment of the mortgage value and the risks of the loan. Given the guiding principal to validate data at the source and incorporating a robust fraud assessment and compliance checks throughout the process, quality of loans produced through Fx is improved over prevailing industry practices. Moreover, the use of computer network technologies including mobile device applications enable the remote access and participation of multiple parties to the process of generating, executing, and creating a mortgage loan. Accordingly, multiple parties (lenders, settlement companies, and investors with the agreement of lenders) may remotely access Fx and information they are authorized to view.

Newer capabilities and/or technologies from the industry, such as Data Sciences to drive predictive analytics to reduce customer acquisition costs, workflow technology to enhance business process management, machine learning to improve efficiencies, human-centered design to develop and implement intuitive customer interfaces, and an operational dashboard to provide real time transparency into the loan origination life cycle, will be leveraged to deliver an innovative solution to the industry.

Fx platforms as disclosed herein represent a holistic ecosystem solution that integrates disparate "point" solutions together to provide a unique interface for lenders, and investors who participate in the creation, execution, and ownership of mortgage assets. In addition to enabling a more efficient and accurate mortgage origination, valuation, and commercialization process, the Fx platform as disclosed herein provides data security and privacy in handling personal identifying information (PII) for borrowers.

An Fx platform as disclosed herein provides electronic closing procedures for loans and mortgages. An Fx platform also provides real time integration between components and parties to the loan and mortgage industries, such as document providers, to generate complete and compliant closing packages. Fx platforms as disclosed herein also provide eVault, and eNotary capabilities to have borrower execute closing packages in accordance with state requirements. Fx platforms as disclosed herein may also include integrating with leading title and settlement agent platforms, including companies which issue title policies leveraging data analytics to streamline the lender/settlement agent business processes. Fx platforms as disclosed herein may also include integration with eRecording platforms for electronic recordation of mortgages with County Recorders. Fx platforms as disclosed herein may also include integration with Mortgage Electronic Registration System (MERS) and eRegistry for the delivery of eNotes to investors.

Embodiments as disclosed herein provide borrowers an enhanced experience by being able to review closing packages prior to the actual signing and have any errors corrected prior to the closing through the Fx platform integration with eClosing systems. Lenders benefit by cutting down on time associated with shipping documents to the closing table and subsequently to investors for funding. Lenders also benefit from reduced operational errors due to missing signatures and/or documents.

Example System Architecture

FIG. 1 illustrates an example architecture 10 for a real estate exchange platform suitable for practicing some implementations of the disclosure. Architecture 10 includes servers 130 and client devices 110 coupled over a network 150. Any one or more of servers 130 is configured to host a memory, including instructions which, when executed by a processor, cause the server 130 to perform at least some of the steps in methods as disclosed herein. In some embodiments, architecture 10 is configured to review, approve, and provide closing documents for a mortgage agreement between a lender and a borrower, who may be the users of client device 110. The one or more servers may host a real estate application accessed by the lender, and have access to one or more databases storing financial information, status, and/or social network information from multiple borrowers.

Servers 130 may include any device having an appropriate processor, memory, and communications capability for hosting a financial exchange application, a digital database, and a mortgage analytical engine. The mortgage analytical engine may be accessible by various lenders using client devices 110, over network 150. In some embodiments, servers 130 may include a network portal for a lender to offer mortgage services to one or more borrowers. The network portal may be protected by one or more firewalls to guarantee data privacy and integrity. In some embodiments, at least one of servers 130 may be part of a blockchain network, and have public and private encryption keys to access public ledgers. Client devices 110 may include, for example, desktop computers, mobile computers, tablet computers (e.g., including e-book readers), mobile devices (e.g., a smartphone or PDA), or any other devices having appropriate processor, memory, and communications capabilities for accessing the mortgage analytical engine through one or more of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2A:
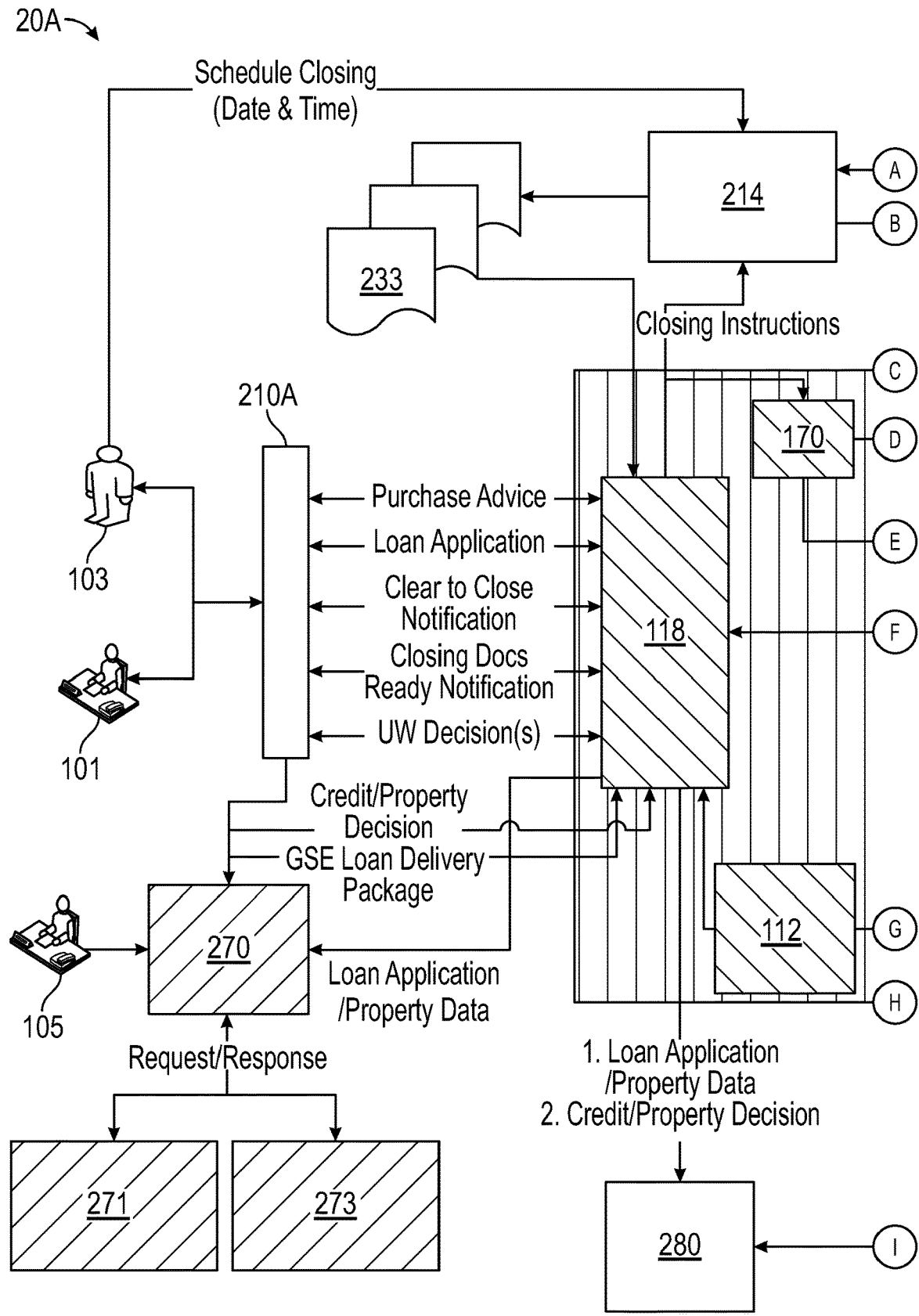
FIGS. 2A-2B illustrate in more detail some of the devices and systems in the architecture of FIG. 1, according to some embodiments.
Figure 2A:
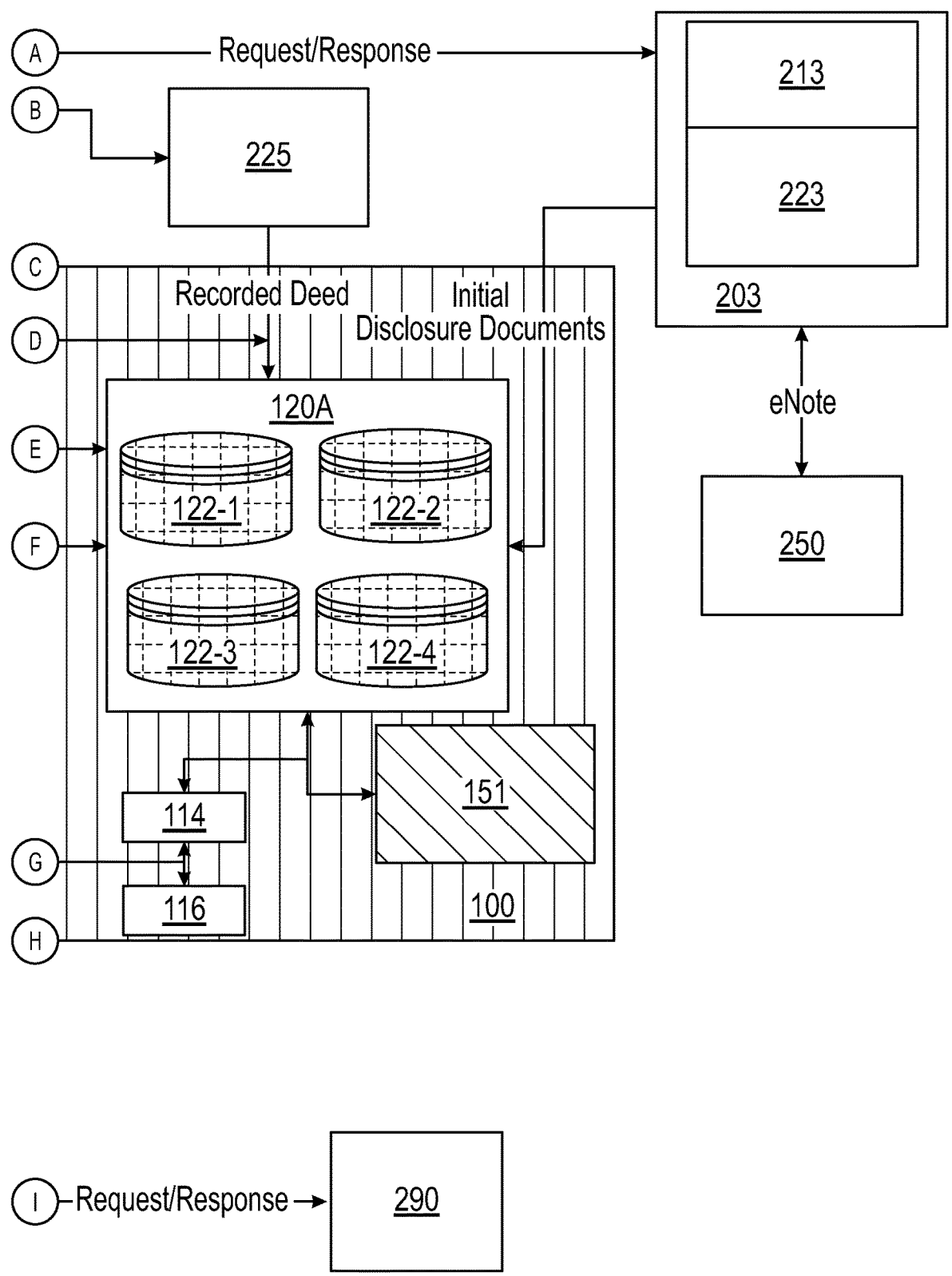
Figure 2B:
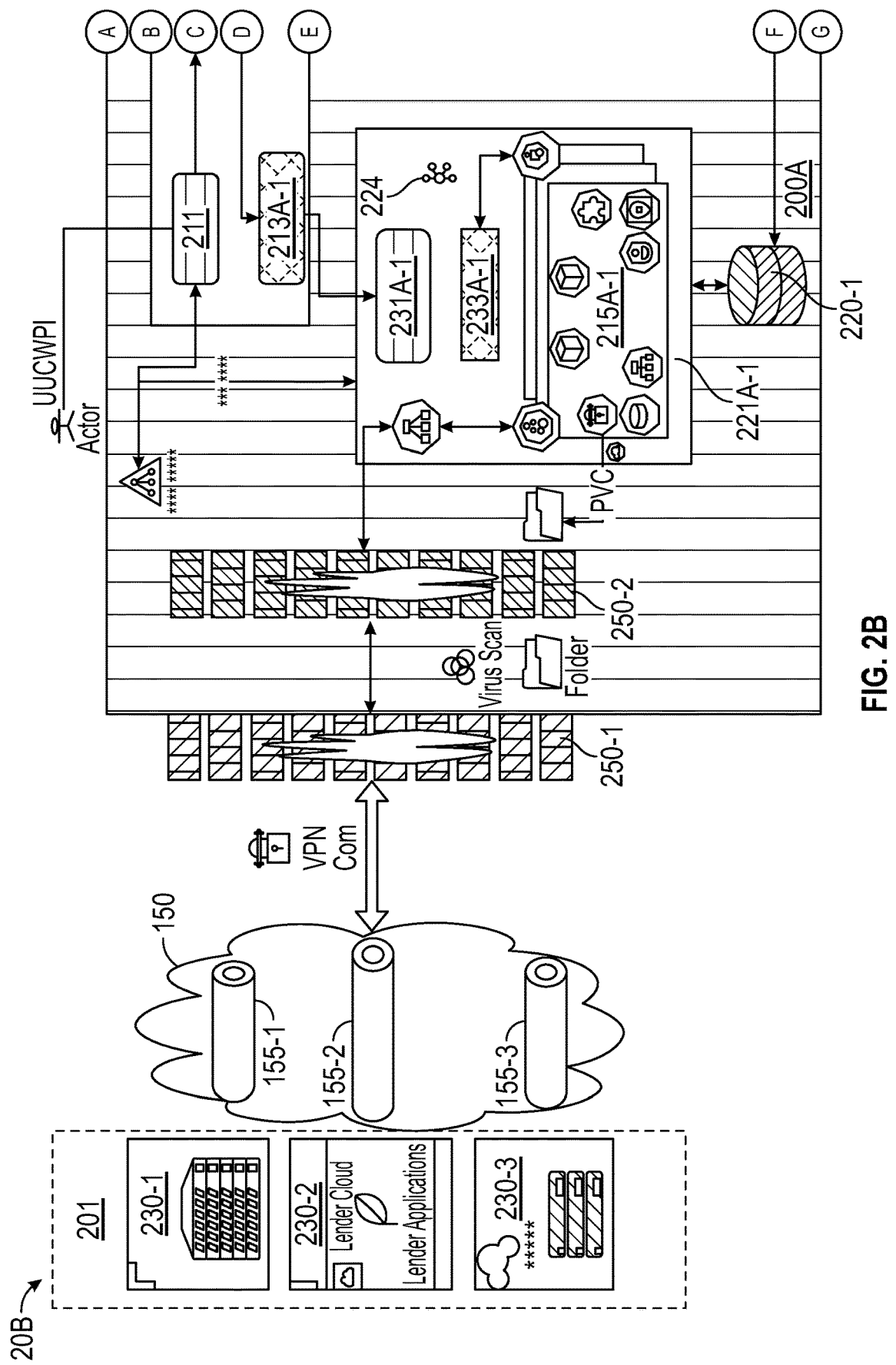
Figure 2B:
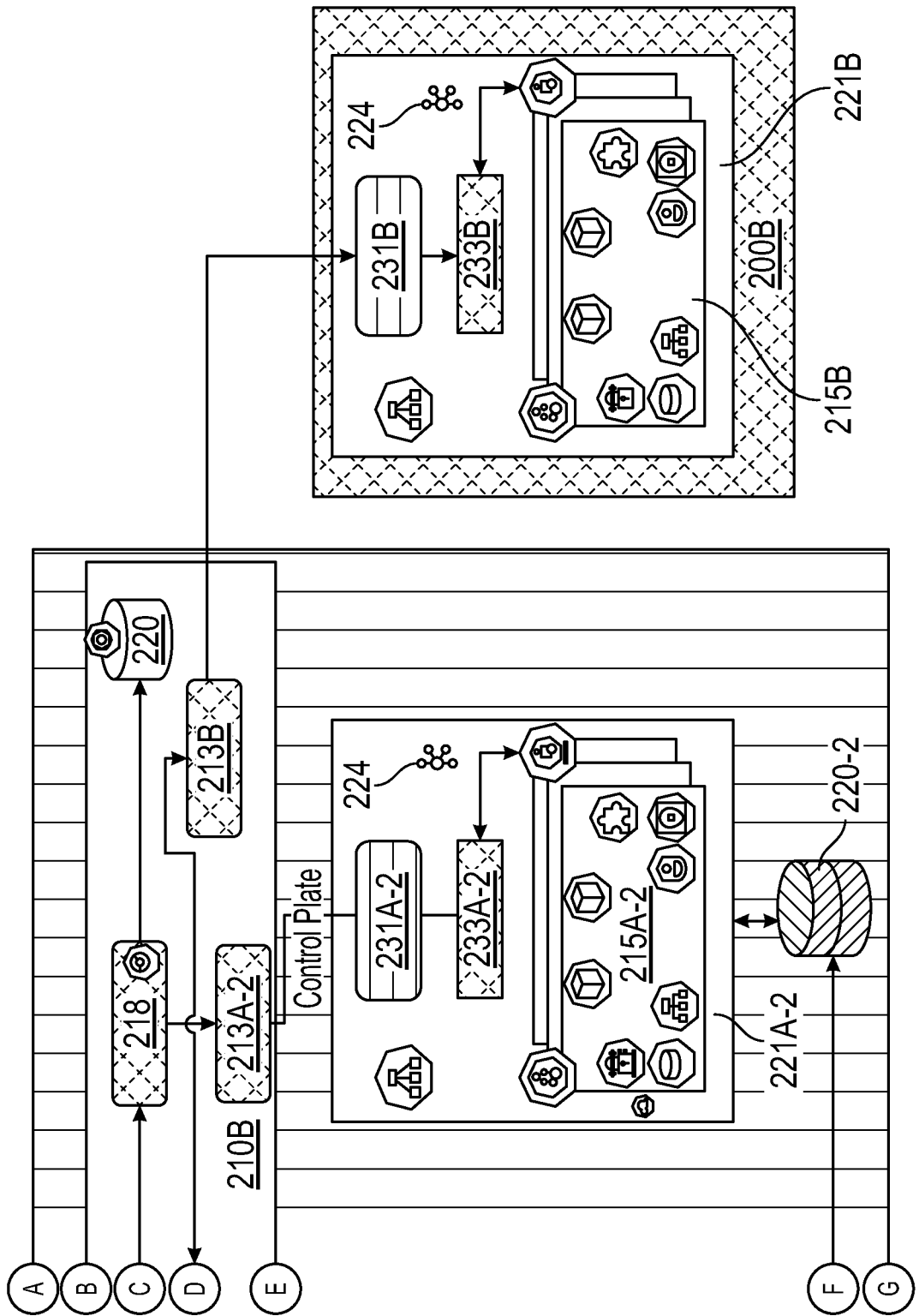

FIGS. 2A-2B illustrate in more detail some of the devices and systems in architecture 10, according to some embodiments.

FIG. 2A illustrates architecture 20A including an Fx platform 100 in a mortgage ecosystem, according to some embodiments. Fx platform 100 is operated by a lender 101 to provide a mortgage contract to a borrower 103 after a number of steps are performed by a mortgage analytical engine 112. In some embodiments, Fx platform 100 provides a mortgage contract 233 that has been finalized (e.g., fully executed closing documents), and underwritten, purchased, and funded by secondary market investors, such as third party investors or a government sponsored enterprise (GSE) 270 (e.g., Fannie Mae, Freddie Mac, and the like) after certification by a custodian 105. Fx platform 100 facilitates the underwriting decision for a lender interested in generating mortgage assets. With an accepted loan delivery package, Fx platform 100 provides a purchase advice from an investor to lender 101 and the transfer of an eNote to the investor, where applicable.

Lender 101 and borrower 103 access an entry port 210A (e.g., a lender point-of-sale (POS) or loan origination software (LOS) system), which may be a network portal wherein borrower 103 fills in an application form from lender 101. The application form may be filled and submitted online, using a network device from borrower 103. The application form includes loan application data, such as financial information about borrower 103, or an assessment of the property value, and the like. Fx platform 100 may find a mortgage loan better suited to the desires and potential financial capabilities (or future capabilities) of borrower 103. Lender 101 may be able to close mortgage contracts quicker, increasing their operational capacity, revenue, and profits. Additionally, lender 101 may have a more accurate and predictive assessment of the ability of borrower 103 to repay a loan, thus reducing potential buy-back request from investors. An intermediate output from Fx platform 100 may include a credit report, an address validation, a fraud check, a verification of employment and income, a verification of assets, a verification of customer identity, a property valuation, a preliminary title, a flood determination, and regulatory disclosures. Fx platform 100 includes an application programming interface (API) 118 to access input data (e.g., credit reports, income, assets, and the like) from original sources or through data validation intermediaries to obtain validated financial information needed to evaluate the credit and capacity of borrower 103 to repay the mortgage loan. In some embodiments, Fx platform 100 may access bank account or other enterprises to access multiple kinds of financial data for validating financial information and credit of borrower 103. Original source documents containing income, employment or asset information will have document recognition and data extraction capability within the Fx platform 100 to index the documents and extract data from documents and deliver structured data to be used in underwriting the mortgage loan. API 118 also validates the borrower information against any fraud, error, discrepancy, or any other data misalignment, via an authentication and fraud service component. In some embodiments, Fx platform 100 receives and validates loan application data from borrower 103 (e.g., employment, income, assets, and the like), through API 118. In some embodiments, API 118 may be configured to automatically fill out government forms to access federal income tax information and confirmation of identity (such as social security number) associated with borrower 103.

Data collected by API 118 is stored in a data lake 120A. Data lake 120A includes one or more databases such as a property evaluation database 122-1, property title database 122-2, a loan request and response database 122-3, and a financial/credit score database 122-4 (hereinafter, collectively referred to as "databases 122"). In some embodiments, data lake 120A includes a data warehouse for loan and loan-related data from multiple users (or sources), such as borrowers, lenders, and investors. Data lake 120A also stores historical data associated with past loans to one or more individuals for verification and to prevent duplicate or fraudulent processing. This historical data is further categorized by loan processing events, which are generated throughout the loan life cycle and are utilized by the machine learning algorithms to provide predictability, straight through processing and operational analytics.

In some embodiments, Fx platform 100 may provide a mortgage insurance 280 linked to an underwriting decision 290 (e.g., when the borrower's down payment is less than 20% of the property value). With the loan application data, an approved investor underwriting decision, and an approved mortgage insurance underwriting decision, Fx interface 100 registers the loan with a mortgage electronic registration system (MERS) 250 and an e-closing provider 203 generates a closing package including final regulatory disclosures and lender closing instructions 213 via electronic signing block 223. In some embodiments, Fx platform 100 facilitates the execution of the closing package in a settlement block 214. Once e-closing provider 203 generates the closing package, a block 225 records the closing in data lake 120A, and the Fx platform 100 produces signed closing package 233, including notarized documents where desired. Fx platform 100 may also record a mortgage asset, obtain mortgage insurance (when required by the investor) and obtain a final title policy. In some embodiments, the Fx platform 100 also facilitates task tracking and exception queue management. For example, in some embodiments, the Fx platform 100 may automatically request missing data (e.g., to borrower 103, or about borrower 103) to the appropriate party (e.g., a bank, borrower 103 or related individual, employer, and the like). Accordingly, the Fx platform 100 may provide a request for the missing data or for an explanation from borrower 103. In some embodiments, the exception management and rules can change over time based on secondary market investor feedback on accepted/rejected assets. Accordingly, the secondary market investor feedback is passed back from 270 into API 118 and stored in data lake 120A. A rejection decision and reason for rejection would be parsed out and stored as historical data in data lake 120A, which influences future business rules. Secondary market investor feedback includes information on loan eligibility, borrower credit, income, employment and asset evaluation, and property evaluation and warning messages. This information may be captured in the data lake and analyzed in machine learning models to discover and/or remediate risk before loan submitting to the secondary market investors for their assessment and purchase decision. This will result in more straight-through processing and higher acceptance of loans by the secondary market investors.

A virtual inspection tool 170 captures property inspection data, and allows a more standardized and faster process to obtain property data to arrive at a final valuation of the property value. Virtual inspection tool 170 may include a mobile application (e.g., installed on a mobile device). The user of virtual inspection tool 170 may include borrower 103 in a refinance transaction, a property seller in a purchase transaction, a licensed property appraiser, and/or lender 101 for post-closing audit purposes. The user of virtual property tool 170 may walk through the property to be inspected, recording a video or taking pictures and other recorded information with virtual inspection tool 170. This inspection may be self-guided or remotely guided. Information collected via virtual inspection tool 170 will be interfaced to Fx 100 data lake 120A to be inspected and processed for a property valuation. Secondary market investors 270 receive property inspection data and obtains collateral underwriting risk scores, which are further utilized in processing future properties of similar characteristics using the M/L algorithms. Historical appraisal data available on the data lake will be further utilized to run M/L algorithms on appraisals to bring predictive or decision criteria on properties that are processed via the Fx platform. An example of this is utilizing appraisal data on a property which was inspected within the last 12-24 months and providing the underwriter information on exceptions/repairs made during the original inspection that can be brought forward as factors to be considered and/or warnings on the current loan processing or refinancing.

A mortgage analytical engine 112 may include a machine learning or artificial intelligence algorithm (e.g., a neural network and the like) processing that trains and runs algorithms to provide predictive analysis and operational performance improvement insights to Fx platform 100. Mortgage analytical engine 112 collects loan and loan-related data and property inspection data from data lake 120A to continuously improve the processing capabilities of Fx platform 100. For example, in some embodiments, mortgage analytical engine 112 may perform exception queue management and use machine learning techniques to filter loans for "fast track" processing. "Fast track" loans refer to loans which are funded with minimal human intervention. Examples of neural network algorithms that may be used may include convolutional neural networks (CNNs), deep learning neural networks, genetic adversarial networks (GANs), supervised neural networks, unsupervised neural networks, and the like. In some embodiments, mortgage analytical engine 112 may include a batch processing component to process daily/nightly batch jobs automatically, even outside of regular business hours. This allows lender 101 to initiate a mortgage asset validation and analysis remotely at any desired time.

When an investor or lender rejects a loan submitted for underwriting, the reasons for rejection may be captured in database 122-3. This data may be used for training the machine learning algorithm so that before loan data is submitted to an investor or lender, data that may cause a rejection is reviewed/updated and the likelihood of the loan being approved is enhanced. Accordingly, the use of machine learning will increase straight-through processing of a mortgage, resulting in faster cycle times, reduced costs, and increased revenue due to better pull-through rates (more applications taken are actually closed and funded).

In some embodiments, Fx platform 100 may include business rules tool 114 coupled with mortgage analytical engine 112 and data lake 120A, to update and run business rules, and validate the data provided by and to, lender 101. In some embodiments, Fx platform 100 may also include a Data validation/File Schema Validation tool 116 to update and validate data files according to the Mortgage Industry Standards Maintenance Organization (MISMO). In some embodiments, business rules include investor or lender specific rules. A lender portal 151 provides a lender dashboard to an administrator or user of Fx platform 100 for handling of one or more mortgage pipeline analyses. Accordingly, lender portal 151 may include a loan summary list view, loan details view for exceptions handling, corrections and reviewing validations for decisions to be made by the loan processor or the loan underwriter or other operating personnel, and the use of the virtual assistant (in various ways).

In some embodiments, Fx platform 100 may further include a data encryption tool that may be called from API 118 to encrypt/decrypt personal identification information (PII) data and store in data lake 120A.

FIG. 2B illustrates a hybrid architecture 20B that combines a private domain 200A and a public domain 200B (hereinafter, collectively referred to as "domains 200") hosting one or more cluster agents 231A-1, 231A-2, and 231B (hereinafter, collectively referred to as "cluster agents 231") for a lender 201. Lender 201 may include a data center 230-1, a publicly hosted server 230-2, or any other cloud provided server 230-3 (hereinafter, collectively referred to as "lender servers 230"). Lender servers 230 may access domains 200 via tunneling applications 155-1, 155-2, and 155-3 (hereinafter, collectively referred to as "tunneling applications 155") through network 150.

A control plane 210B directs the service request from lender 201 to either one of the private domain 200A or the public domain 200B. Architecture 20B may include a virtual private network (VPN) configured to ensure data integrity and privacy via an external firewall 250-1 and an internal firewall 250-2 (hereinafter, collectively referred to as "firewalls 250") with virus scanning capabilities. Firewalls 250 ensure that there is no anonymous traffic entering the VPN environment illustrated in architecture 20B. The control plane 210B distributes tasks within the private domain 200A and the public domain 200B. An authentication proxy 211 verifies the credentials of cluster administrator 201 and prompts an API server 218 to activate a primary cluster controller 213A-1, a secondary cluster controller 213A-2, and a public cluster controller 213B (hereinafter, collectively referred to as "cluster controllers 213"). Control plane 210B may also access an encrypted database 220 to store data for cluster resources 201 (e.g., data associated with one or more resources of cluster 201). Database 220 contains information about tasks and data coming down the pipeline to be distributed among the different cluster agents 231.

Within Fx 100 architecture 20B, API server 218 distributes tasks as micro-services to cluster controllers 213, and graphic user interfaces (GUIs) and devices. Control plane 210B oversees and monitors the health of cluster architecture 20B, including cluster controllers 213 and cluster agents 231. For example, control plane 210B determines whether a cluster is established within private domain 200A or within public domain 200B based on client preferences, workload, and server availability. In some embodiments, a given client or lender 201 may want to have their own private domain for their specific purposes and reasons. In yet some embodiments, the same client 201 may decide to have one or more cluster agents 231A in private domain 200A and one or more cluster agents 233B in public domain 200B.

Cluster controllers 213 manage operations for cluster agents 231. Each one of cluster agents 231 includes an API server 233A-1, 233A-2, and 233B, respectively (hereinafter, collectively referred to as "API servers 233"), handling the specific operations of each one of worker nodes 215A-1, 215A-2, and 215B (hereinafter, collectively referred to as "worker nodes 215"). Worker nodes 215 perform the multiple tasks associated with reviewing, processing, documenting, and verifying a mortgage application by a borrower through lender 201. In private domain 200A, a primary deployment 221A-1 holds primary cluster agent 233A-1, and a secondary deployment 221A-2 holds secondary cluster agent 233A-2. Primary deployment 221A-1 and secondary deployment 221A-2 will be collectively referred to, hereinafter, as private deployments 221A. Cluster agents 233 control worker nodes 215 within private deployments 221A. Private deployments 221A may be redundant copies stored in database 220-1 and 220-2 (hereinafter, collectively referred to as "databases 220"). Accordingly, secondary deployment 221A-2 may replace primary deployment 221A-1 when this service becomes unavailable for any unforeseen incident (e.g., network failure, power/connectivity loss of a network component, and the like). In public domain 200B, a public deployment 221B holds worker nodes 215B accessing API server 233B within cluster agent 231B. Moreover, there is nothing limiting about having primary and secondary deployments 210A, and embodiments consistent with this disclosure may include a tertiary deployment, quaternary deployment, and so forth.

In some embodiments, deployments 221A and 221B may have access, within each of worker nodes 215, to a distributed event streaming platform 224 to enhance data pipelines, streaming analytics, data integration, and other applications handled by API servers 233. Micro-services in Fx 100 architecture 20B may be reactive in nature. Event streaming platform 224 includes a data integration server with a streaming agent that may couple with data collectors that provide information to the tasks handled by Fx 100 architecture 20B. One of the services may be integration to a blockchain network. In some embodiments, event streaming platform 224 may link API servers 233 to a blockchain network, providing desirable access keys and encryption to place at least some of the contents in databases 220 in a public ledger of a blockchain network.

Fx 100 utilizes Artificial Intelligence (AI) driven via Machine Learning (M/L) algorithms at various stages of the loan processing cycle and maximizes the use of business rules driven processing which reduces the overall "time to close" and enhances borrower experience thereby optimizing lenders' operations and strategies. These provide various capabilities for the lender via an interactive and proactive platform—a lender portal. In some embodiments, a lender portal is designed to provide users (processors, underwriters, closers, funders, investor delivery, operational leadership) of Fx platform 100 with the following capabilities: Holistically view what stage each of the loans are in their processing cycle and what critical loan specific actions they need to take that day; ability for a user to go to a specific loan and take the necessary action with assistance from the "virtual assistant" provided in terms of relevant lender/investor policies and/or steps to resolve the issue (s); ability to collaborate with users across different operational areas to meet customer commitments; as the system learns, drive completion of tasks automatically, such as asking for reasons for an employment gap or a credit inquiry from the borrower; monitor operations in real time, identify and analyze business process bottlenecks, and based on use of machine learning models recommend solutions and predict operational results based on the implementation of those solutions; and benchmark performance against the industry and platform participants across key operating metrics such as cycle time for loan approvals, operational costs and application to funding ratios.

Figure 3:
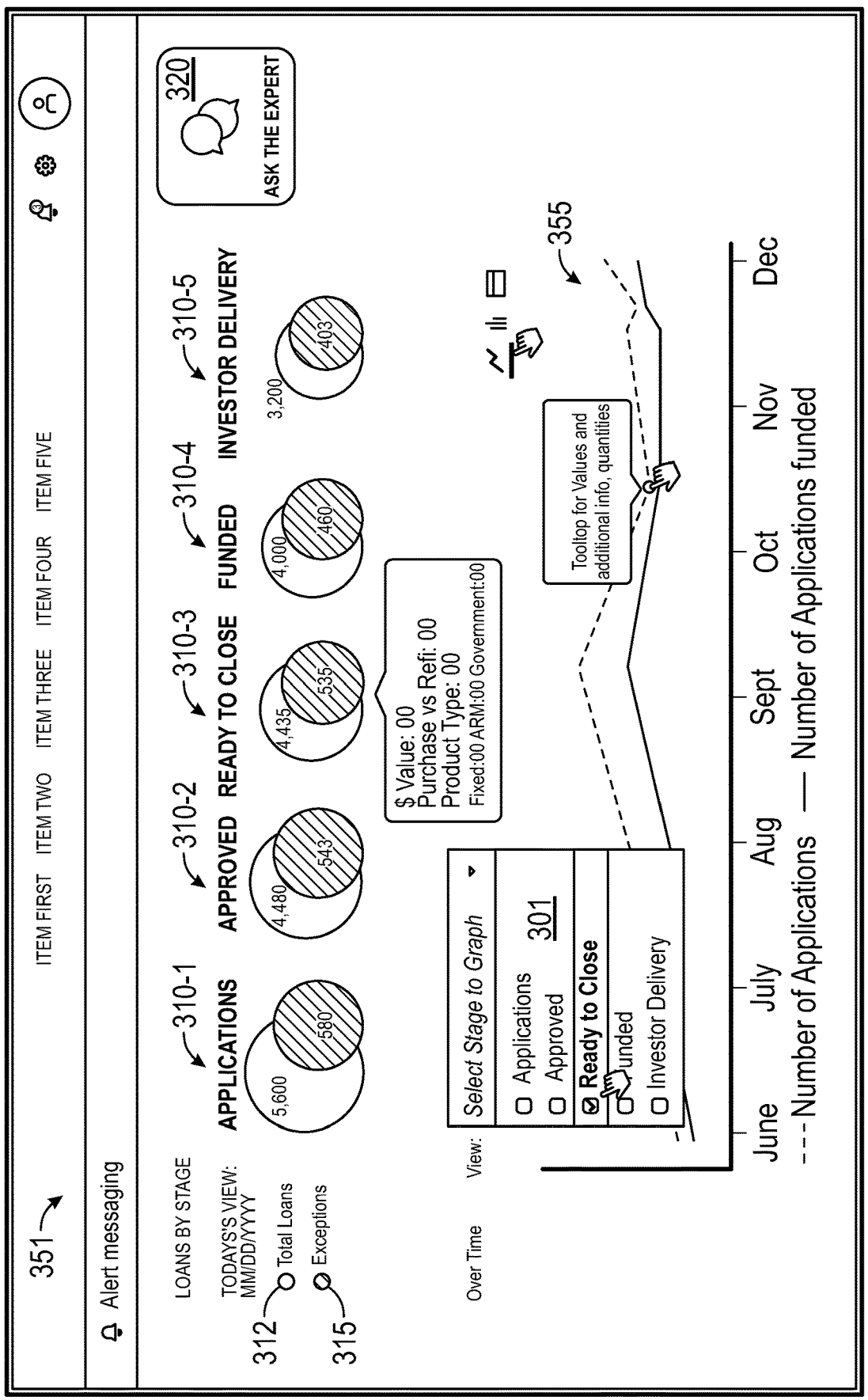
FIG. 3 illustrates a dashboard in a real estate finance exchange application for lenders, according to some embodiments.

FIG. 3 illustrates a screenshot of a lender operational portal 351 provided by a graphic user interface (GUI) to a user of the Fx platform (e.g., a lender or investor), according to some embodiments. In some embodiments, lender portal 351 provides real time transparency of Fx operating platform performance. Accordingly, lender portal 351 may provide a GUI to display loan and loan-related data contained in a data lake (e.g., data lake 120A). The GUI may report key operating metrics of the Fx platform and identify in real-time operational bottlenecks via a virtual assistant 320 running an AI algorithm in the analytical engine. In some embodiments, loan performance may be divided into stages 310-1 (applications), 310-2 (approved), 310-3 (ready to close), 310-4 (funded), and 310-5 (investor delivery), hereinafter, collectively referred to as "stages 310."

In some embodiments, lender portal 351 may provide virtual assistance to lenders every day, at any time (24×7 availability), to support user inquiries, to provide capability to directly login to the Fx platform, and to submit loans for back-end processing. In some embodiments, the GUI also provides anonymized ecosystem usage data and trends 355. Trends 355 may be selected within any one of stages 310, via a menu 301 (e.g., Ready to Close stage 310-3). In some embodiments, virtual assistant 320 may include a chat bot ('Ask the Expert') wherein the lender may interact with the growing body of Fx's knowledge base to ask questions or request further information. In some embodiments, the capabilities of virtual assistant 320 are enhanced through a machine learning or artificial intelligence application running in the analytical engine.

In some embodiments, lender portal 351 links anonymized data on the Fx platform with data from multiple lenders for performance benchmarking, and provide visibility for selected data and other statistical information and benchmarks amongst multiple lenders (e.g., proficiency relative to an average performance, and the like). Moreover, in some embodiments, a financial institution may access lender portal 351 to have a detailed view of the performance of multiple associates within the financial institution, and assess value added for each associate to improve efficiency.

In some embodiments, lender portal 351 provides the user the ability to get a snapshot of loans in the application through investor delivery stage 310-5, including those that have some deficiencies/exceptions that need to be addressed. By hovering over the specific stages 310, the user can get key information regarding specific characteristics of a loan, such as dollar value, purchase versus refinance transaction, and product type (Fixed, ARM, Government) for both the total population of loans 312 and those in an exception category 315. Additionally, the user can ask for trended monthly data for loans in various stages of operations.

Examples of this may include comparing the performance of a specific bank or lender against the industry and/or peer group for specific Key Performance Indicators such as mix of purchase versus refinance funded volume, cycle time for the "ready to close" stage 310-3, and the like.

In some embodiments, the user will be able to click on the exception bubble 315 for any of stages 310 and be directed to a stage detail screen for further review and action.

FIG. 4 illustrates a stage detail in dashboard 451, according to some embodiments. The stage detail shows the population of loans for High Priority category 410-1, Medium Priority category 410-2, Low Priority category 410-3, and normal 410-4 category in the approval stage (cf. stage 310-2), highlighted by color coding to direct appropriate attention of the user (hereinafter, collectively referred to as "categories 410").

The user is able to click on a specific category 410 and see the population of loans 430 by specific exception reasons, such as Insufficient Income, Insufficient Assets, and/or Low Credit Score (e.g., for loans in the High Priority category 410-1). Additionally, the user is able to view details for each of the loans identified, review the loan, and take the appropriate action(s) to resolve the exception. The listing of loans 430 may be sorted according to any one of different features selected by the user, namely: priority status 425-1, loan ID 425-2, name 425-3, amount 425-4, and details 425-5 (hereinafter, collectively referred to as "loan features 425").

The user may also be able to see the loan details for loans in Normal category 410-4 which do not have any specific exceptions that need to be resolved.

In some embodiments, an 'Ask the Expert' chat bot 420 in dashboard 451 may include an AI feature to assist the user by providing additional information or guidance. Examples of this may include how to resolve a social security number discrepancy, what to do if there is an employment gap in the borrower's job history, when to get an explanation for credit inquiries and what to include in qualifying income for a borrower. In some embodiments, the virtual assistance feature of the lender portal will provide the user with AI driven messages based on the loan data exceptions/warnings which need to be reviewed by the loan processor or underwriter. This can be achieved by expanding the loan line item to show more details as shown in FIG. 4 and represented by 430.

More generally, the Fx platform may include AI algorithms to improve the user's ability to fully leverage the platform and the information that is available to the lender to help them resolve issues, pull documents related to user queries, policy, and user guides, as well as understand characteristics of the loan applications and assets for which the lender is responsible. Additionally, AI will be used to help improve the precision of Fx business rules over time, and will make the existing features of Fx more efficient to increase the benefits to Fx users as they use the platform over time.

The virtual assistant may also help to improve precision of business rules and be able to independently adapt the Fx platform to increase the benefits the Fx platform can automatically deliver, and provide proactive notification (via e-mail) to the users regarding actions taken or that need to be taken. Virtual assistant will be based on M/L and AI algorithms to utilize historical loan processing data to automatically resolve issues when they occur or present exception issues to users with policy guidelines on how to resolve them. This will lead to faster cycle times to approve the loan and a reduction in operational costs. The predictability of the loan closing is provided to the loan processor/underwriter on lender portal (e.g., portal 351) showing an anticipated date of closing based on analytical AI algorithms and loan data with historical processing times for similar loans processed via the Fx platform.

Figure 5A:
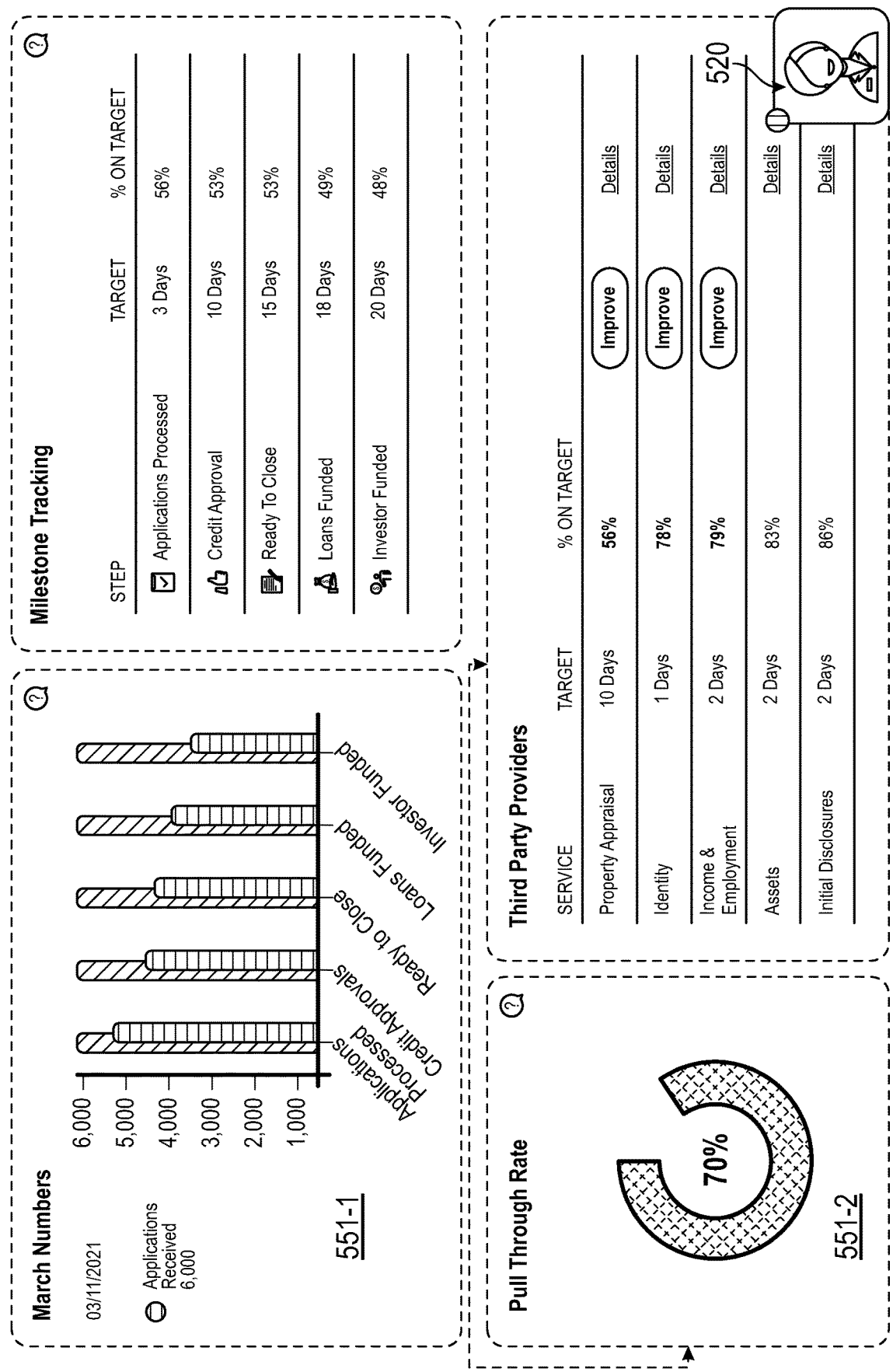
Figure 5A:
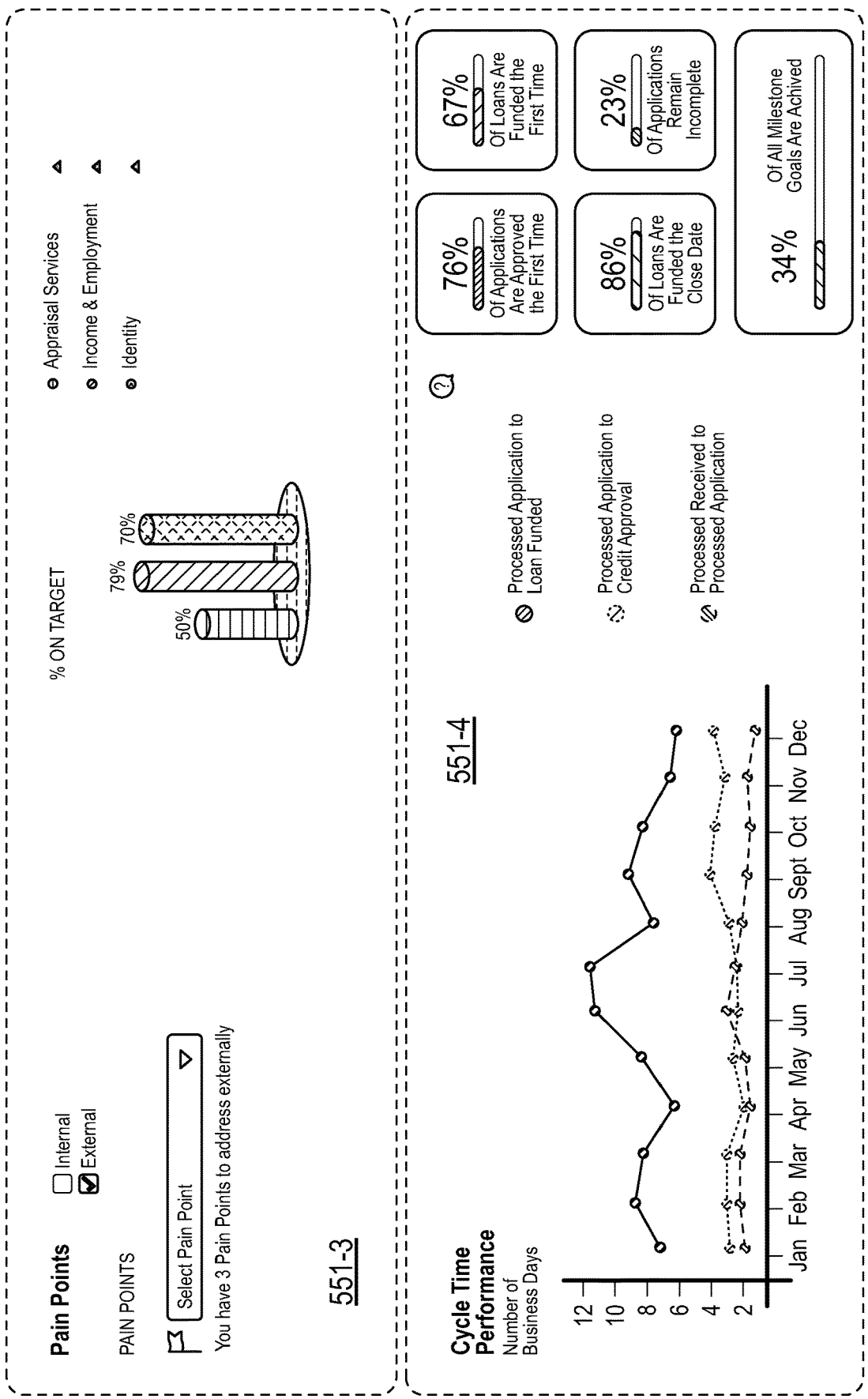
Figure 5B:
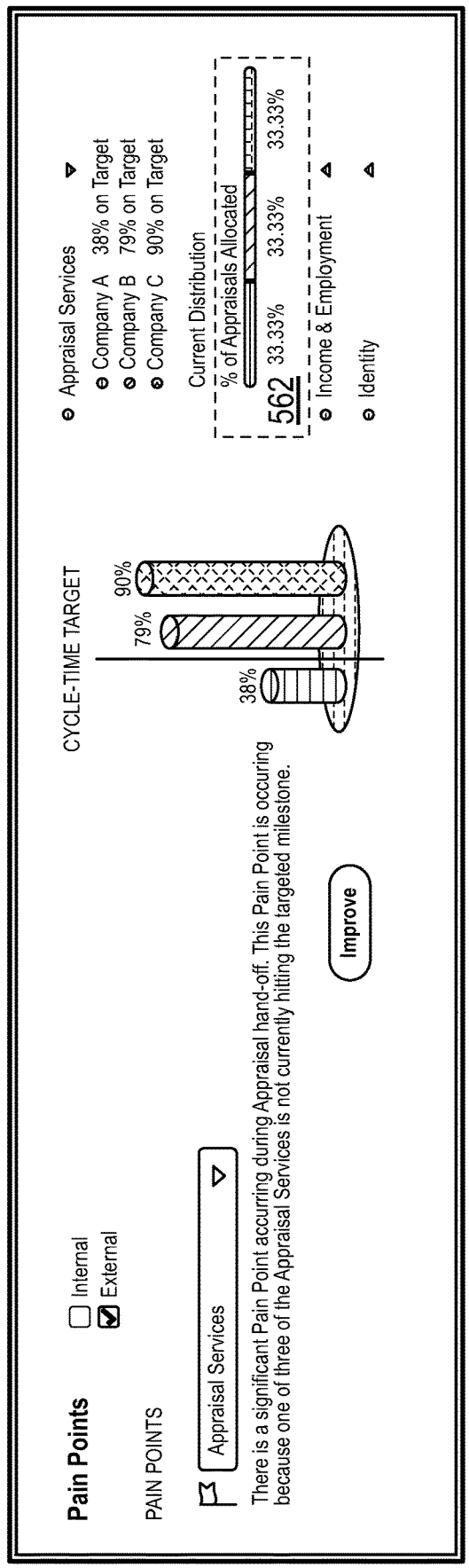

FIGS. 5A-5C illustrate several screenshots of a portal as used by an administrator, such as an operations leader, of a lender organization through a lender portal (e.g., portals 151 and 351), according to some embodiments. The screenshots provide a holistic view of strategies that may be implemented to improve workflow.

In FIG. 5A, a frame 551-1 includes a histogram of case numbers accrued over a given period of time (e.g., "March, 2021"). The histogram may be classified (X-axis) as per "Applications Processed," "Credit Approvals," "Ready to Close," "Loans Funded," and "Investor Funded." Frame 551-1 may also include a milestone tracking chart version of the above histogram. A frame 551-2 includes information about third party providers listing the entities that provide documentation that is relevant for assessing a loan (e.g., "property appraisal," "identity," "income and employment," "assets" and "initial disclosures"). Frame 551-2 also illustrates a virtual assistant 520 that the user can access for information, questions, and the like. A frame 551-3 includes a list of the aspects that may identify and offer opportunities to improve the performance of a lender in terms of successful loans processed (e.g., "Pain Points"). A frame 551-4 includes a cycle time performance. For example, the ops managers can be provided recommendations on which appraisal company to use, which has the best historical performance, shown clearly on the performance histogram and comparison analysis on appraisal companies.

FIG. 5B illustrates a more detailed view 560B of the pain points in frame 551-3, including an allocation distribution bar 562, illustrating the proportion of tasks assigned to each of companies A, B, and C. Data represented on FIG. 5B is based on the data analytics run on historical performance of the companies A, B and C. Specific description of the pain point is provided in terms of actionable language for remediation based on processing via AI algorithms.

In FIG. 5C, a field 561-1 compares the performance of three providers or vendors (e.g., Company A, Company B, and Company C) for the property assessment. An average monthly return rate chart 561-2 indicates the average time, in days, for return work by each of the companies in field 561-1. A suggestion box 561-3 provides an allocation distribution of tasks 562C amongst the three vendors (company A, B, and C), that has a projection 563 to increase the performance (measured as percent of appraisals on target) to a goal of 85%, within two or three weeks. When the user accepts the proposal, it may submit the changes using button 565.

FIGS. 6A-6L illustrate several screenshots of dashboards 650A, 650B, 650C, 650D, 650E, 650F, 650G, 650H, 650I, 650J, 650K, and 650L (hereinafter, collectively referred to as "dashboards 650") as used by an administrator of a lender organization through a lender portal (e.g., portals 151 and 351), according to some embodiments. Dashboards 650 illustrate several features that visually help the lender administrator to get a clear picture of the mortgages being processed by the lender organization and their status. Dashboards 650 may feature a virtual assistant 620 that issues messages 621D, 621E, 621F, 621G, and 621I (hereinafter, collectively referred to as "messages 621"). In some embodiments, messages 621 may appear as text messages in dashboards 650. In some embodiments, in addition to, or instead of, text messages, messages 621 may include voice messages, or even a video displaying virtual assistant 620 as an avatar.

Figure 6A:
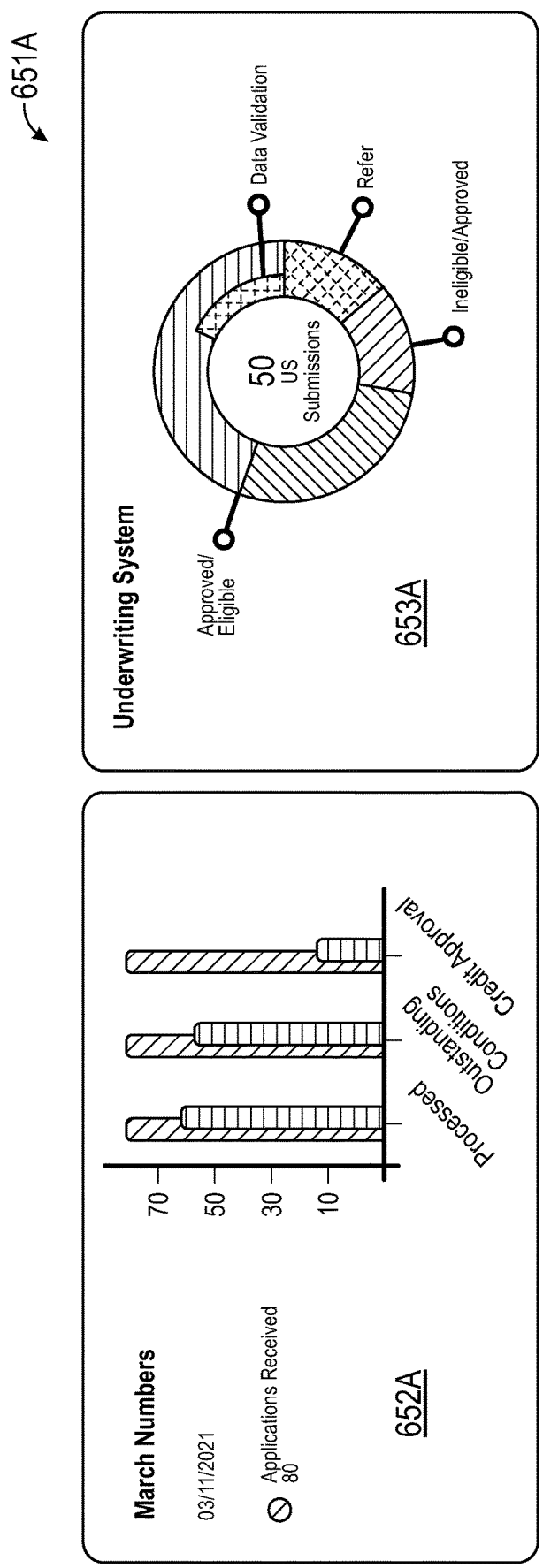
Figure 6A:
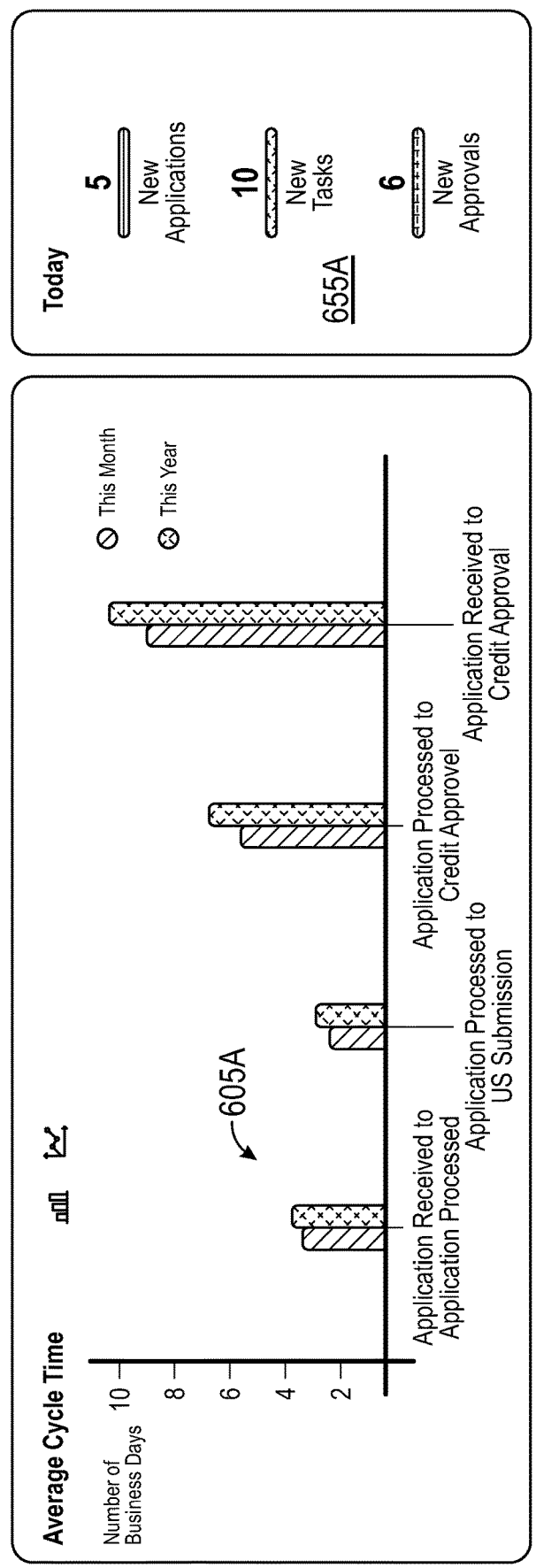

FIG. 6A illustrates a processor dashboard 650A with features as follows. A histogram 651A indicates the "March" numbers for loans or mortgages with "processed," "outstanding conditions," or on "credit approval" phase. A donut chart 653A indicates an underwriting system (US) usage, graphically apportioning the number of US submissions, a proportion of US approved or eligible submissions, the number of US data validations (within the US approved or eligible submissions), the number of US referrals, and the number of US ineligible and approved loans. A bar chart 605A indicates average cycle time (per current month, and year-to-date, in number of business days) for selected measurement points such as "applications received to application processed," "application processed to US submission," "application processed to credit approval," and "application received to credit approval." An inset 655A may indicate a daily status of new applications received, new tasks to do, and new approvals.

Figure 6B:
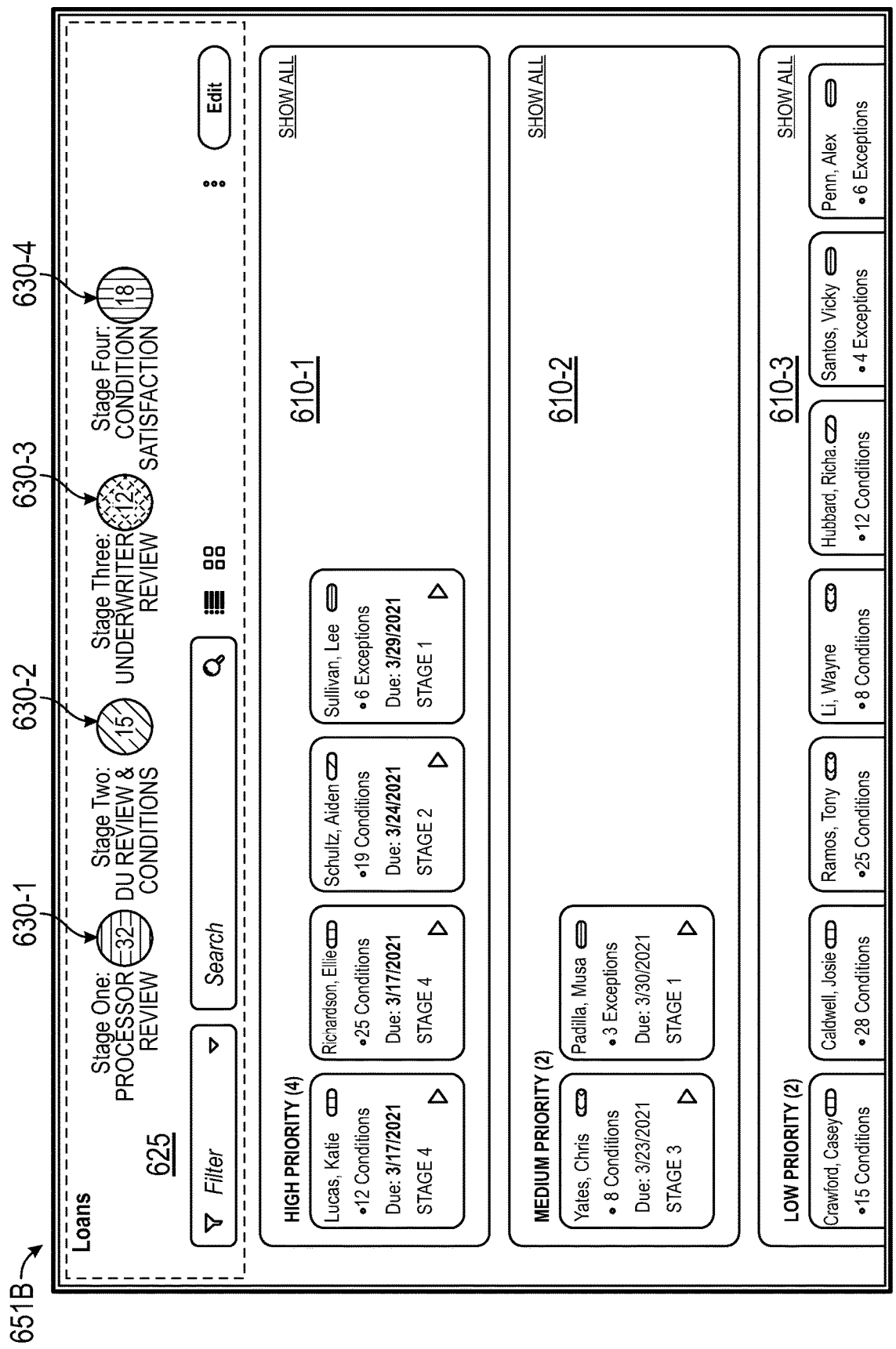

FIG. 6B illustrates dashboard 650B with features as follows. A loan field 625 includes a number 630-1 of loans in stage one: processor review, a number 630-2 of loans in stage two: US review and conditions, a number 630-3 of loans in stage three: underwriter review, and a number 630-4 of loans in condition satisfaction (hereinafter, collectively referred to as "loan stages 630"). Panels 610-1, 610-2, 610-3 (hereinafter, referred to as "panels 610") illustrate more details about loans in each of the high priority (610-1), medium priority (610-2), and low priority (610-3) stages.

FIG. 6C illustrates dashboard 650C with features as follows. Loan field 625 and loan stages 630 may include annotations and warnings 615C, and a detailed listing 635C of the loans in loan field 625 including attributes such as loan stages 630, priority status, tasks, description, date assigned, due date, and access to other details. The loan listing 635C also indicates loans which need a higher priority for processing or exceptions handling, indicated by the "Due date" and "Priority status" columns.

Figure 6D:
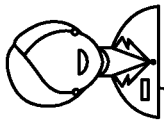

FIG. 6D illustrates dashboard 650D featuring the details attributes for a specific loan (cf. dashboard 650C). A panel 641 indicates detailed information about the specific loan, including name of borrower, name of assigned processor within the lender, loan officer, underwriter, and other attributes such as exceptions and conditions for the loan. Any of the authorized personnel from the lender (e.g., the assigned processor, the officer, or the underwriter) may place annotations and warnings 615D in dashboard 650D. In addition, a virtual assistant 620 may pop up with suggestions in text 621D, for example to address some of the exceptions listed in panel 641. A timeline 645 indicates expected completion dates and status of each of stages 630.

Figure 6E:
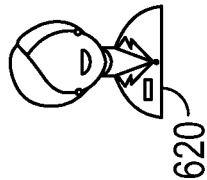

FIG. 6E illustrates dashboard 650E featuring panel 641 with the exceptions cleared, and virtual assistant 620 prompting the user to submit the loan application to US and move on to stage 630-2, via message 621E. Timeline 645 shows stage 630-1 as incomplete, and the other stages not started.

FIG. 6F illustrates dashboard 650F with panel 641 and details of stage 630-2 of the application, wherein virtual assistant 620 issues a text 621F indicating that the US is currently reviewing the application, and prompting the user to request an underwriter, and noting that an underwriter may be automatically assigned after the US review is complete. A status bar 643 indicates stage 630-1 is complete and stage 630-2 has started. Timeline 645 reflects status bar 643 on a time schedule basis (expected and actual completion dates).

Figure 6G:
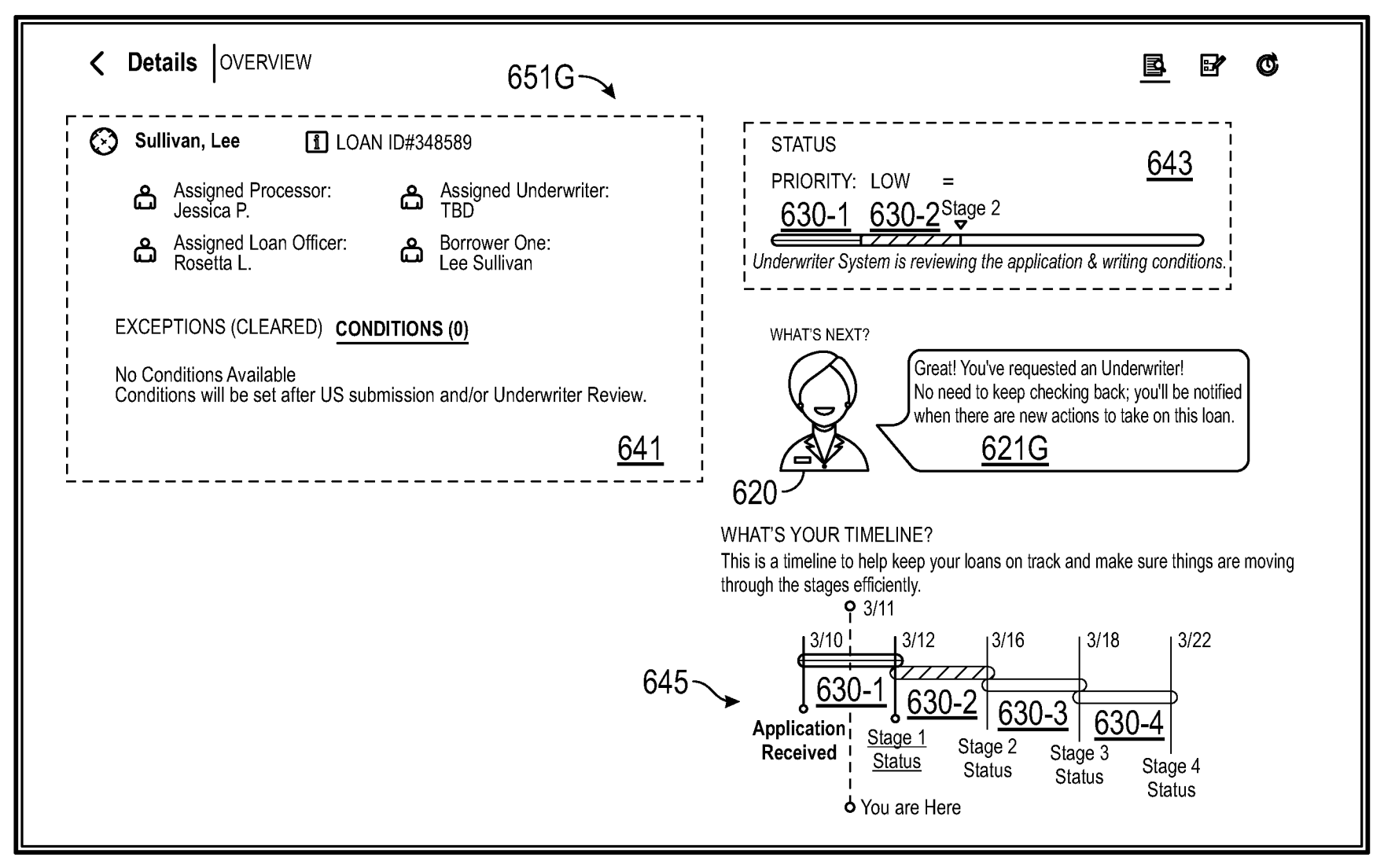

FIG. 6G illustrates dashboard 650G with features as follows. Panel 641 indicates all exceptions have been cleared, and status bar 643 indicates that stage 630-1 is completed and stage 630-2 is in progress. Timeline 645 reflects status bar 643 on a time schedule basis (expected and actual completion dates). Virtual assistant 620 issues a message 621G indicating "you've requested an underwriter! No need to keep checking back; you'll be notified when there are new actions to take on this loan."

Figure 6H:
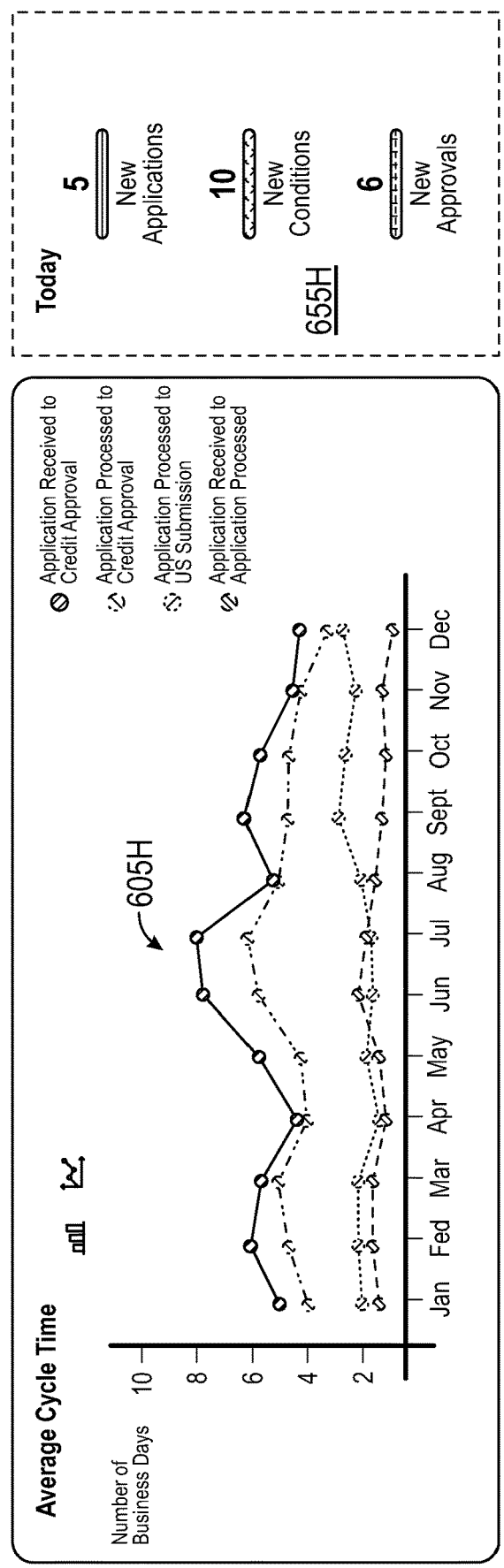

FIG. 6H illustrates an embodiment of an underwriter dashboard 650H with features as follows. A histogram 651H indicates the "2021" numbers for loans or mortgages with "processed," "outstanding conditions," or on "credit approval" phase. A donut chart 653H indicates an underwriting system (US) usage, graphically apportioning the number of US submissions, a proportion of US approved or eligible submissions, the number of US data validations (within the US approved or eligible submissions), the number of US referrals, and the number of US ineligible and approved loans. A line chart 605H indicates average cycle time (per current month, and year-to-date, in number of business days) for selected measurement points such as "applications received to application processed," "application processed to US submission," "application processed to credit approval," and "application received to credit approval.". An inset 655H may indicate a daily status of new applications received, new tasks to do, and new approvals.

Figure 6I:
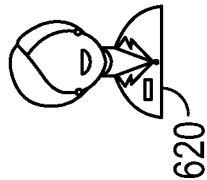

FIG. 6I illustrates dashboard 650I with features as follows. Panel 641 indicates no exceptions and a number of conditions, and status bar 643 indicates that stages 630-1 and 630-2 are completed, and stage 630-3 is in progress. Timeline 645 reflects status bar 643 on a time schedule basis (expected and actual completion dates). Virtual assistant 620 issues a message 621I stating that it "looks like the underwriter is setting conditions . . . " and prompting the user to start clearing some of the conditions. In some embodiments, virtual assistant 620 may offer tips to the user for satisfying the conditions.

FIG. 6J illustrates dashboard 650J with condition features when the user selects a conditions tab in panel 641 (cf. dashboard 650I). The conditions may be determined by the underwriter, and include attributes such as a condition itself, resolution, data added, date due, and status.

FIG. 6K illustrates dashboard 650K with more details on condition features including unresolved conditions 660-1, conditions pending approval 660-2, and cleared conditions 660-3.

FIG. 6L illustrates dashboard 650L with a history of details for a number of loans and attributes such as loan name, data, action taken, a commentary or description, and a status.

FIGS. 7A-7J illustrate devices 710 and screenshots for a mobile application 722 including a virtual inspection tool as disclosed herein (cf. virtual inspection tool 170). Mobile application 722 may be installed in a mobile device of a user (e.g., an appraiser, a homeowner, or borrower). Accordingly, the appraiser schedules an appointment with the homeowner or borrower for a virtual property inspection. Thus, a standardized process for internal and external subject property inspection is established. Mobile application 722 provides screenshots 750B, 750C, 750D, 750E, 750F, 750G, 750I and 750J (hereinafter, collectively referred to as "screenshots 750") to the user.

In some embodiments, devices 710 may include a remotely controlled drone with a video recording capability, configured to collect snapshots and other relevant property information, captured automatically. The drone may include a flying device, or a land-roving device. In some embodiments, the drone may also take snapshots of the property illustrating the location of the property relative to relevant landmarks such as roads, utilities, commercial areas, and geographic features such as rivers, creeks, waterways, lakes, hills, mountains, forests, public parks, and the like. Moreover, in some embodiments, the drone may provide topographical capabilities to assess heights, depths, and relative positioning of the property in its urban/geographic environment. Accordingly, devices 710 offer the capability for complete automation of the property appraisal task, further enhancing the efficiency and accuracy of property appraisal.

The appraiser may perform some deskwork based on real estate property listing services (ex. MLS) and other property data sources for the subject property and comparable property sales. The virtual property inspection eliminates appraiser non-productive driving time and allows the appraiser more time for the value-added tasks of analyzing data and completing the property appraisal report.

The homeowner and/or borrower does property inspection with the mobile application, guided by the appraiser. This improves quality of appraisal due to use of a standardized process for conducting a property appraisal.

Figure 7A:
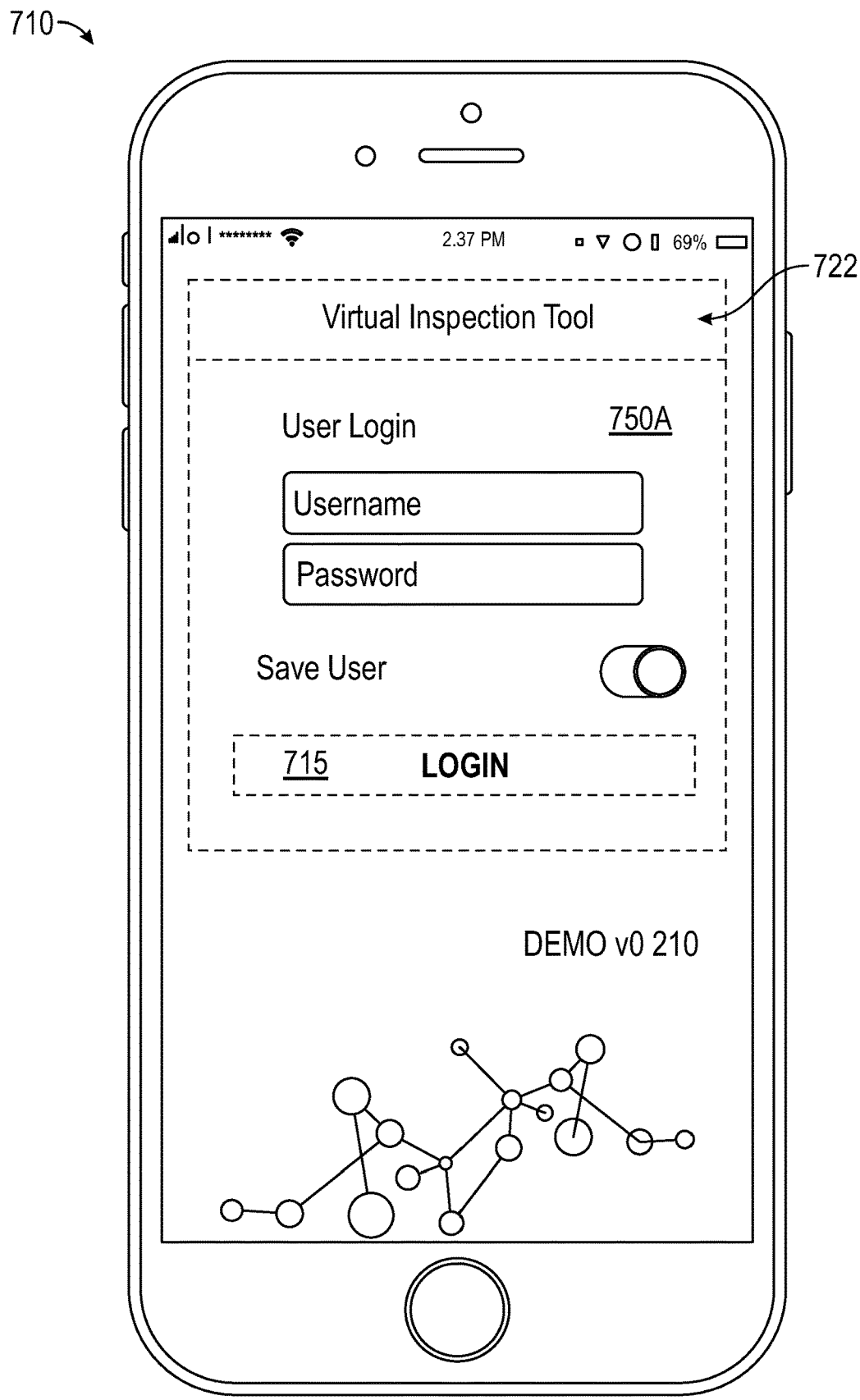

FIG. 7A illustrates a device 710, according to some embodiments. Device 710 may be a smart phone or any other mobile device having a virtual inspection tool 722 installed therein. A user login 750A including login credentials 715 enables the user access to virtual inspection tool 722 to prepare a property appraisal.

Figure 7B:
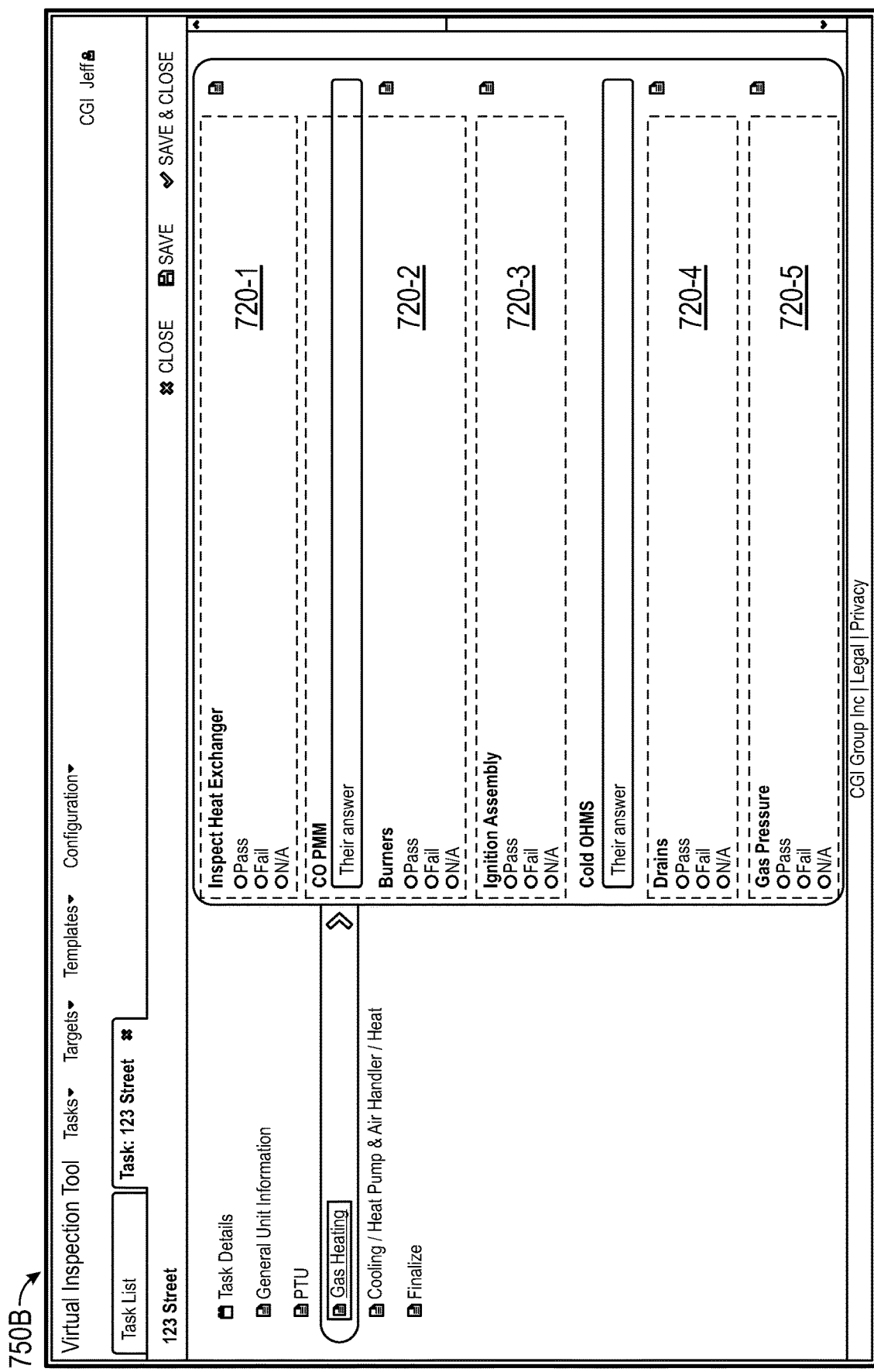

FIG. 7B illustrates screenshot 750B, with an inspection tool for a gas heating facility in a property, as follows. The inspection tool includes a field 720-1 to list results for a heat exchanger inspection, a field 720-2 for inspecting burners, a field 720-3 for inspecting an ignition assembly, a field 720-4 for inspecting drains, and a field 720-5 for inspecting gas pressure. Hereinafter, fields 720-1, 720-2, 720-3, 720-4, and 720-5 will be referred to, collectively, as "inspection fields 720."

Figure 7C:
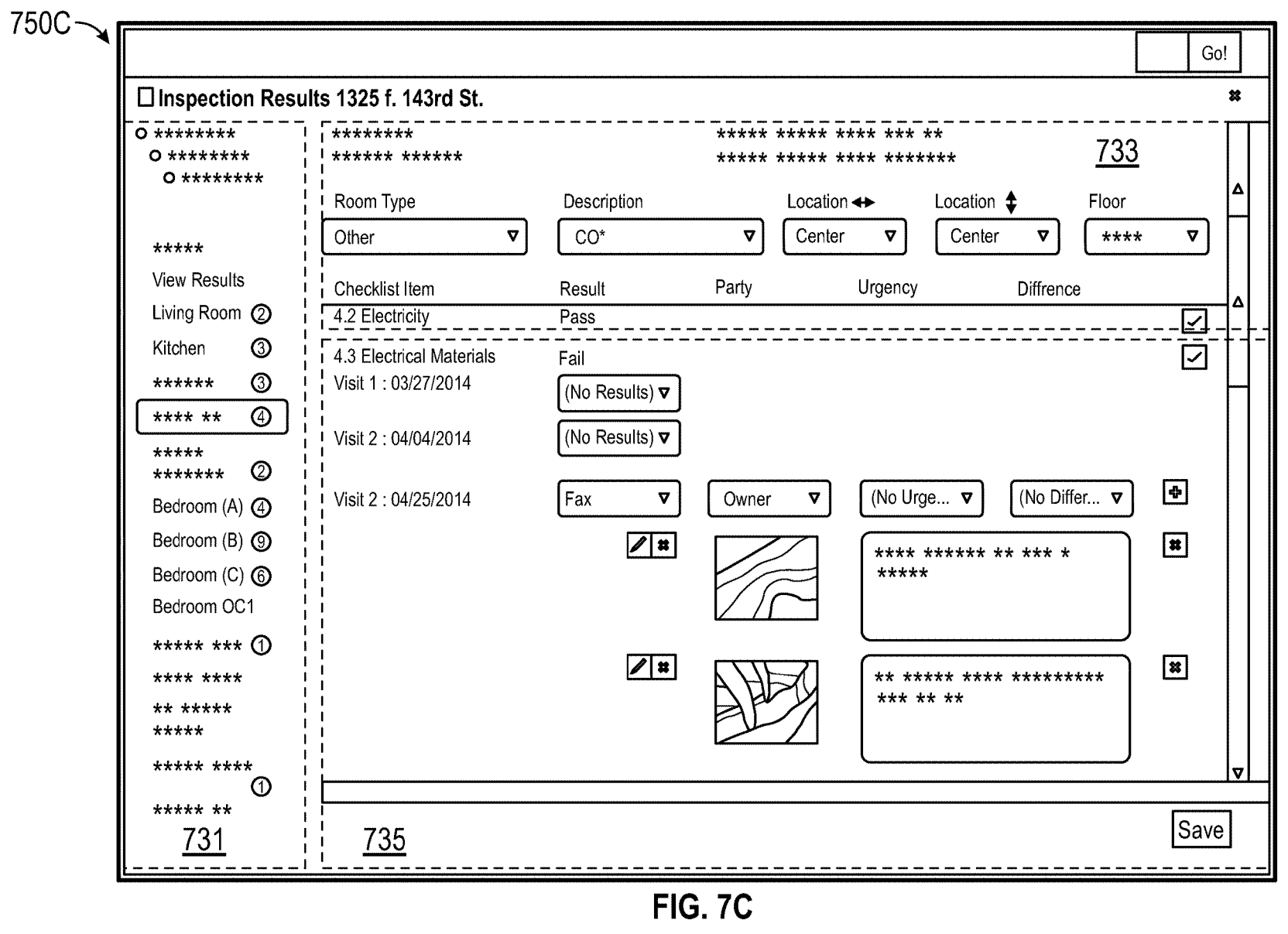

FIG. 7C illustrates a screenshot 750C with inspection results. A listing 731 of different inspection classes may be selected by the user. The user may select a specific inspection feature from a menu 733. A more detailed field 735 may include a listing of each inspection feature with comments, pictures, and other information.

Figure 7D:
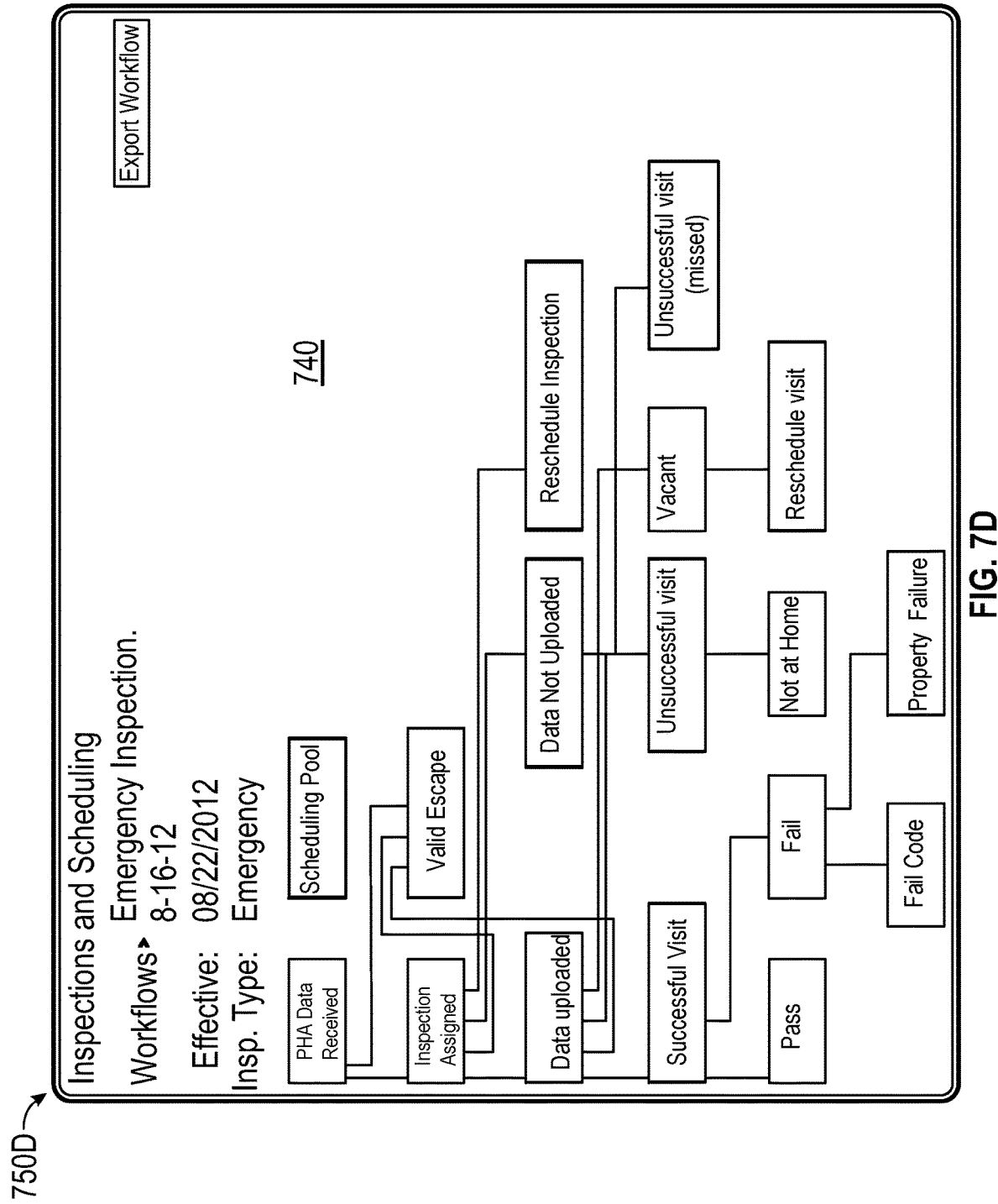

FIG. 7D illustrates a screenshot 750D with a robust and dynamic workflow 740 of a virtual inspection engine that enables remote execution of business process rules and operations. Mobile application 722 can be customized as desired for each appointment type.

Figure 7E:
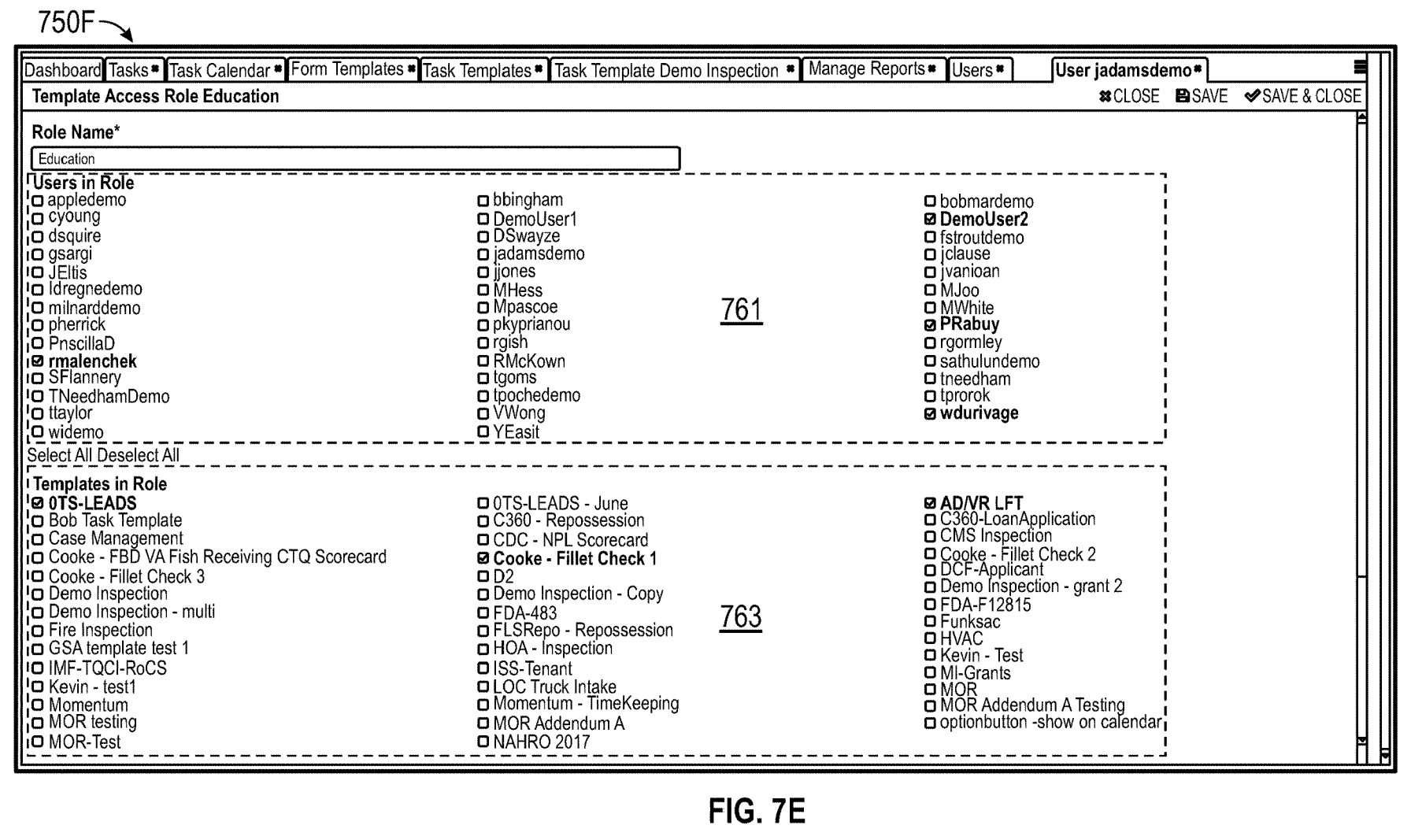

FIG. 7E illustrates screenshot 750E listing information associated with mobile application 722 according to a "role" in the inspection. Field 761 lists users of mobile application 722 according in the role of "Education." Field 763 lists templates for tasks in the "Education" role. Definitions of some terms used in screenshot 750E are as follows: User Roles—a user is categorized into a role in mobile application 722. The role defines what templates are available to the user, e.g., Joe is a "homeowner" working with an appraiser to inspect the property, Jen is an "inspector" working for an appraiser; Task—defines the property location, type of inspection that needs to be done, e.g., Task—1001 Lakeside view property/single home; Template—a template defines the particular steps that need to be taken for a specified task; e.g., home inspection for refinancing for single home, home inspection for purchase.

Figure 7F:
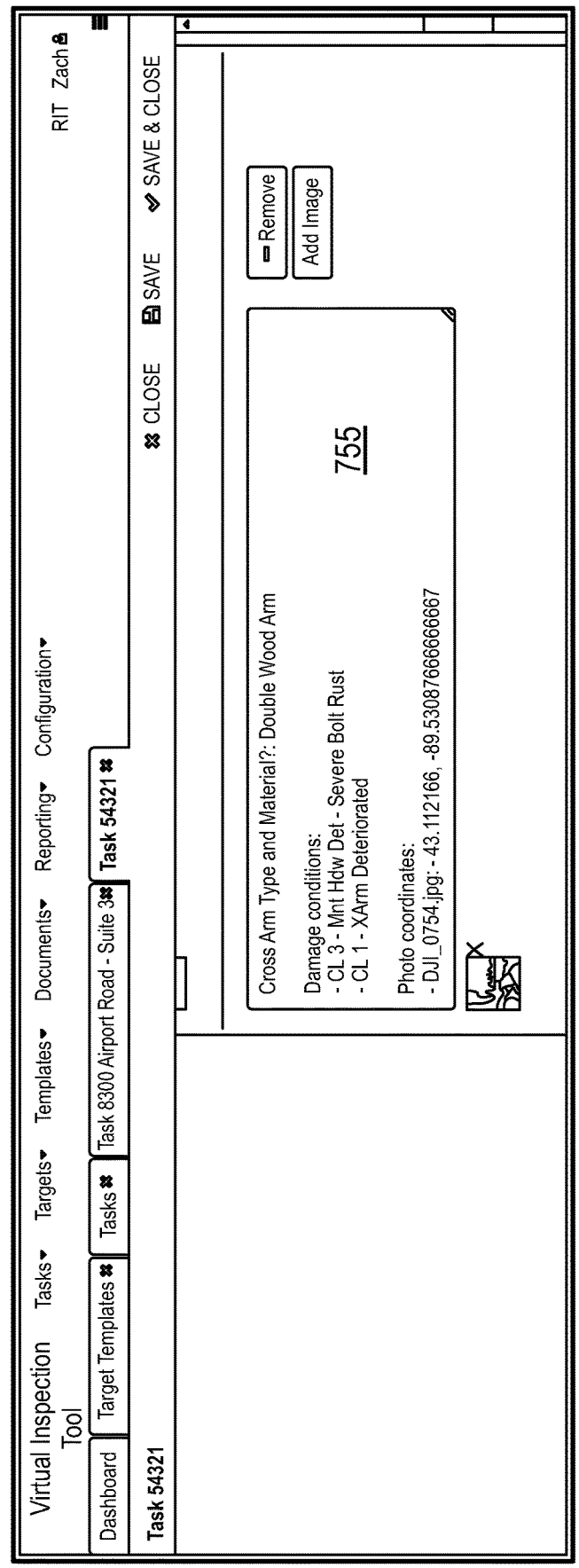
Figure 71:
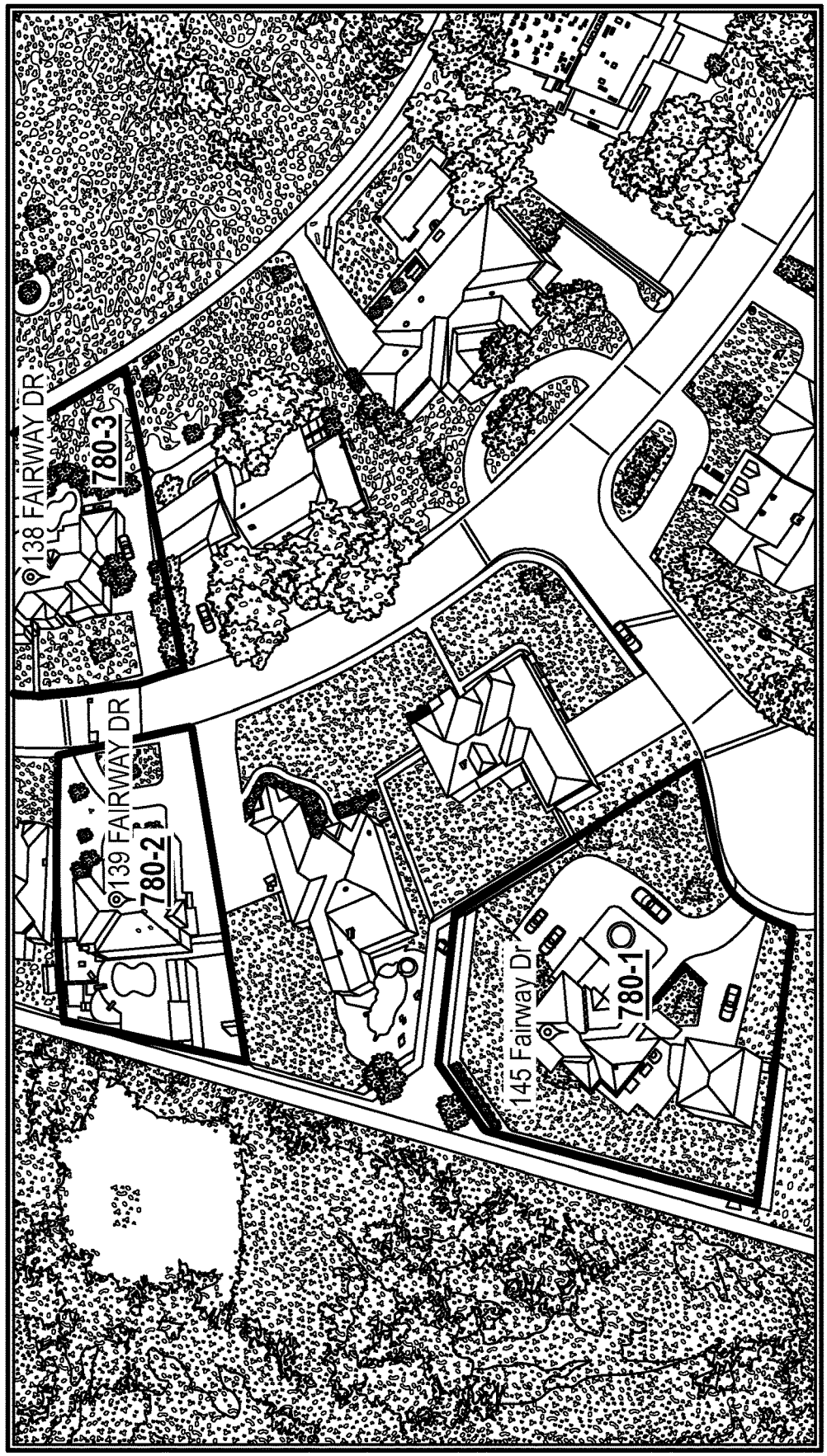

FIG. 7F illustrates a screenshot 750F listing a specific inspection task 755. Screenshot 750F shows sub-tasks—which define a list of items to check during an inspection (e.g., heater, stove, electrical switches, drains, roof, and the like).

FIG. 7G illustrates screenshot 750G, with information about a specific user of mobile application 722. The information may include user name, status, contact information, and a list 765 of different roles that the user may have for one or more inspection tasks.

FIG. 7H illustrates screenshot 750H, with information for a specific inspection task 755H. An authorized user may access screenshot 750H and select different operations such as copy 771 inspection task 755H (e.g., to create a new task), export 773 an inspection report (e.g., as a spreadsheet), view 775 the inspection report, or send 777 the inspection report via e-mail to a selected target.

FIG. 7I illustrates an aerial picture 750F of real estate properties 780-1, 780-2, and 780-3 (hereinafter, collectively referred to as "real estate properties 780"). Aerial picture 750F may be retrieved from any web resources and mapping engines. In some embodiments, aerial picture 750F may be retrieved by a drone driven explicitly through, or requested by, mobile application 722. In some embodiments, the drone device may be provided by a third party, and incorporated into application 722 via a fully extensive API that uses restful services, e.g., java script object syntax (JSON and the like).

The drone device may hover over real estate properties 780 to reach out hard to access areas. In some embodiments, application 722 may overlap demarcations over picture 750F illustrating the limits, perimeter and area of real estate properties 780. For example, in some embodiments mobile application 722 may calculate distances and areas based on geolocation information provided by the drone device, or collected from any web resource. In addition to the features mentioned above, aerial picture 750F may also indicate certain terrain conditions such as geological features (geological fractures, porous layers, solid rock terrain and the like), or man-made features such as pipelines (e.g., water, sewage, canals, natural gas), buried or aerial power lines, telephone lines, cable lines, and the like. In some embodiments, a drone inspection may be desirable when safety conditions for inspection are not satisfied, or unknown (e.g., an exposed power line, or unknown gas pipeline nearby, and the like).

In some embodiments, a drone integrated with the system (driven and controlled by mobile application 722) takes pictures of the exterior of the subject property, including photographs of the street and neighborhood where the subject property is located. This reduces cost to conduct a property appraisal.

In some embodiments, the drone takes pictures and/or videos of the exterior of comparable property in the vicinity of the property for sale. In some embodiments, a machine learning or artificial intelligence algorithm may assist the appraiser in selecting comparable sales to use for property appraisals. The machine learning algorithm may be installed in a remote server communicatively coupled with the mobile device, in the mobile device itself, or in a memory chip installed in the drone.

The appraiser evaluates subject property based on internal and external review of data and images collected by the mobile application, integrated with drone capabilities. Comparison against sold properties is performed by the appraiser to determine subject property valuation. Accordingly, a machine learning algorithm may determine property valuation for review and appraiser acceptance.

Figure 7J:
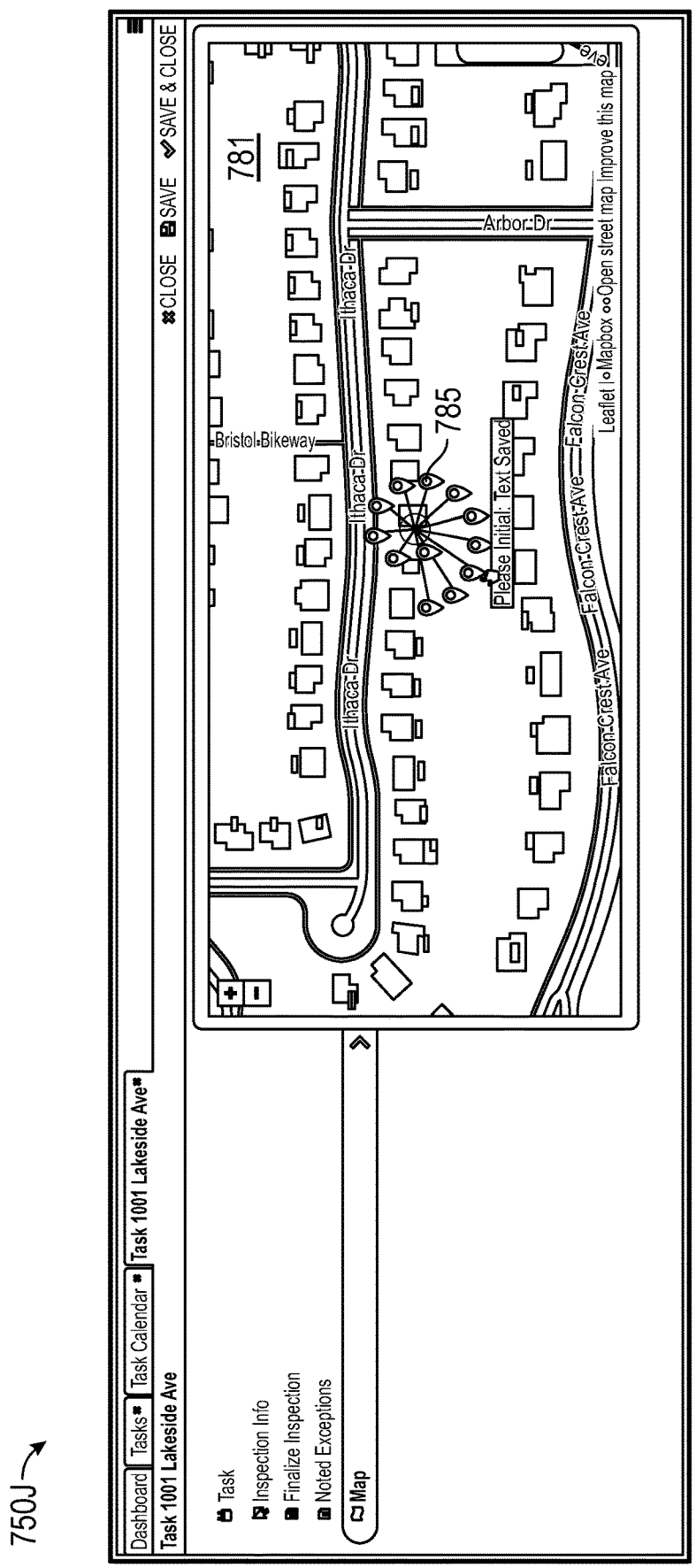

FIG. 7J illustrates screenshot 750H, showing a map 781 of a property that has been inspected. Map 781 includes icons 785 indicative that a certain picture, video capture, or other data collection, the time, and specific location at which the data collection took place. Accordingly, Mobile application 722 is able to guarantee that an inspection with true data collection has taken place, by anchoring each data collection event to a place and a time that should match the inspection task attributes. Such features prevent fraudulent inspections, and guarantee a transparent inspection and mortgage analysis process.

Figure 8A:
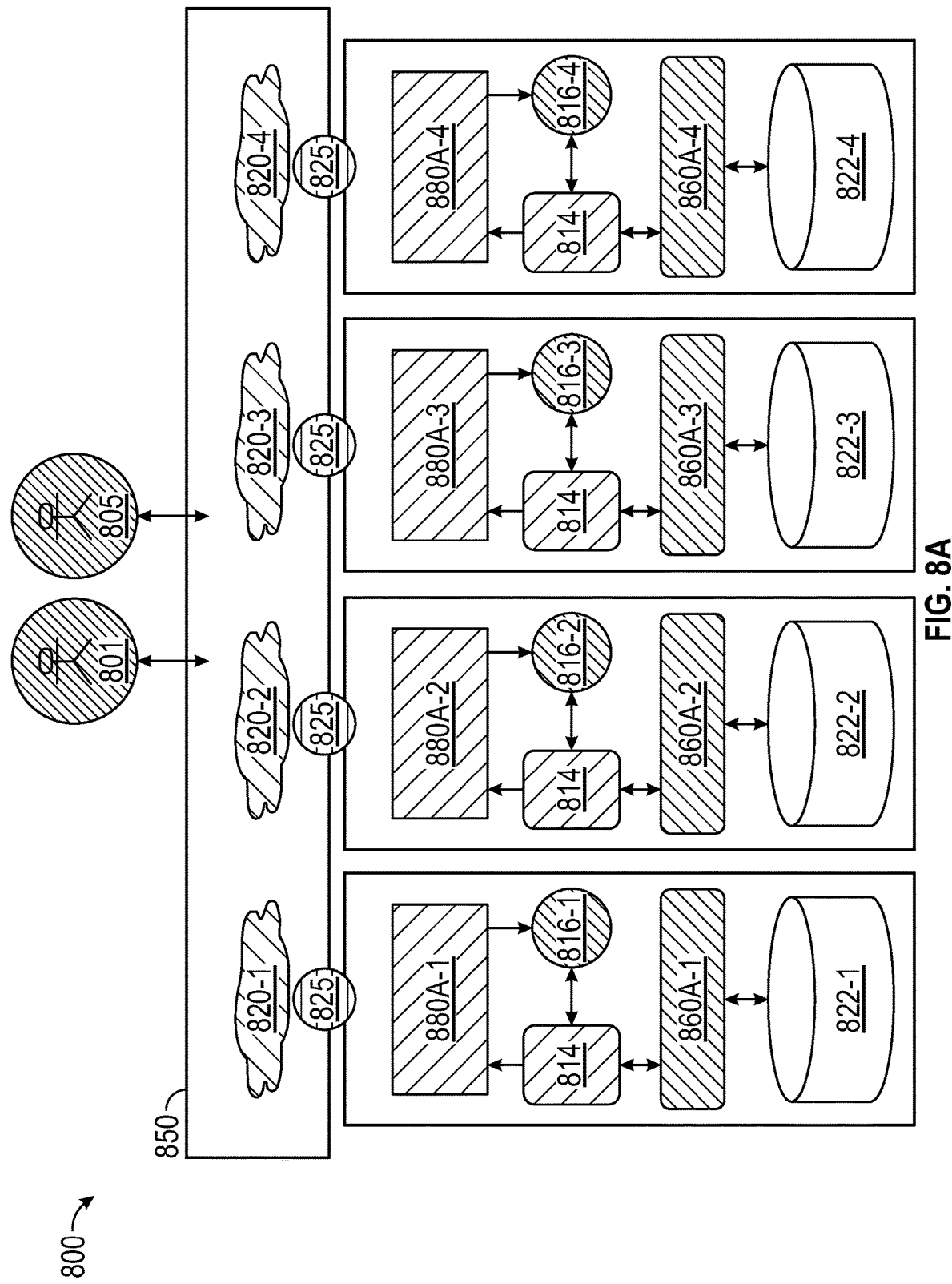
FIGS. 8A-8B illustrate a block diagram and steps in a computer-implemented method for reviewing a loan application, according to some embodiments.
Figure 8B:
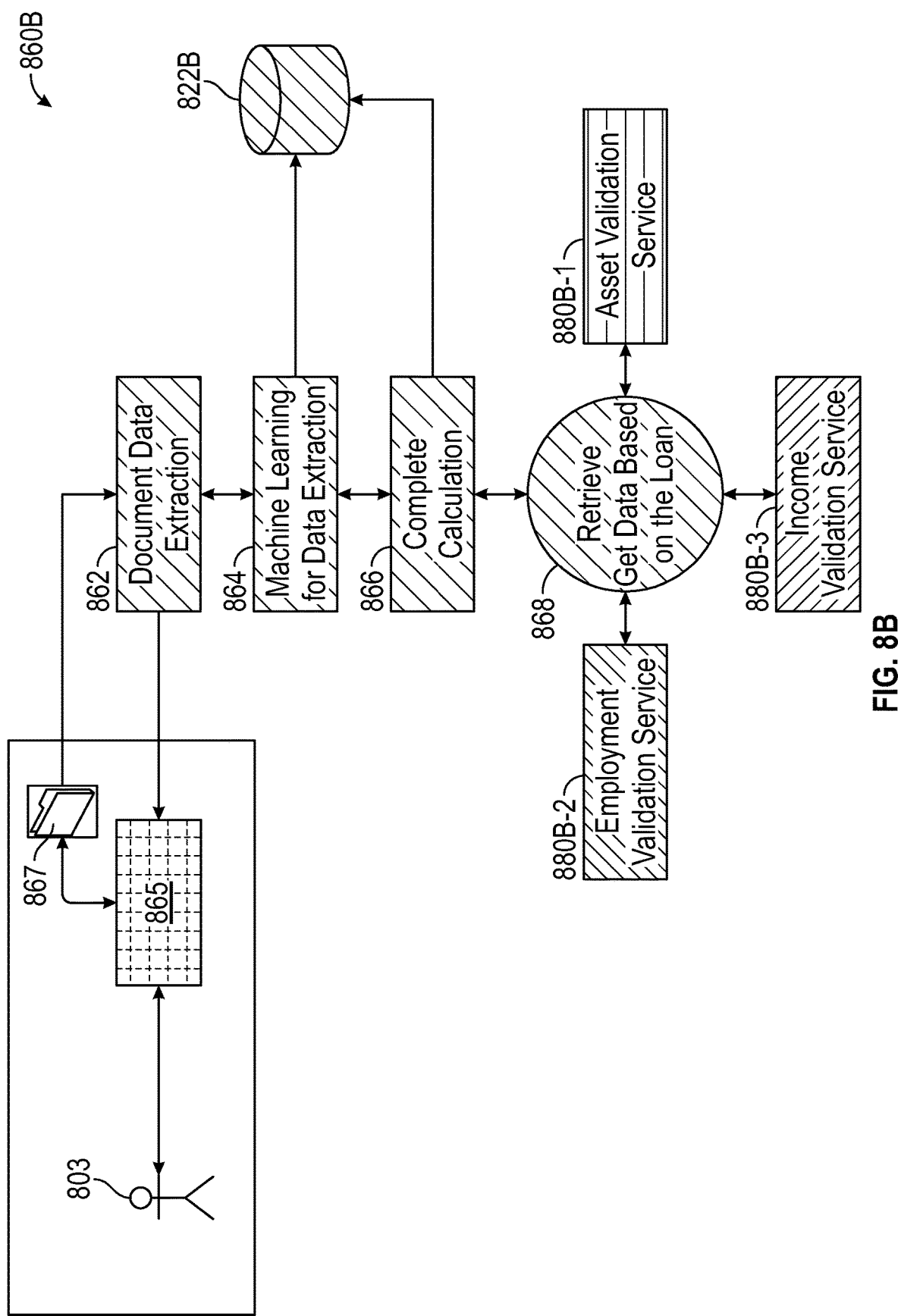

FIGS. 8A-8B illustrate a block diagram 800 and steps in a computer-implemented method 860B for reviewing a loan application, according to some embodiments. Block diagram 800 illustrates a lender 801 and a loan underwriter 805 accessing artificial intelligence (AI) functionality through a dashboard 850. Dashboard 850 includes virtual assistants for specialized services, 820-1, e.g., for loan origination services; 820-2, e.g., for lender 801; 820-3, e.g., for asset/income/employment—AIE—verification; and 820-4, e.g., for an underwriting service (hereinafter, collectively referred to as "virtual assistants 820"). Virtual assistants 820 communicate with particular types of analytical service, referred to as loan services 880A-1, e.g., loan validation service; 880A-2, e.g., lender guide; 880A-3, e.g., AIE service; and 880A-4, e.g., underwriter service through a knowledge repository system 825. Loan services 880A-1, 880A-2, 880A-3, and 880A-4 will be referred to, hereinafter, as "loan services 880A." Loan services 880A operate via predictive analytical algorithms 816-1, 816-2, 816-3, and 816-4 (collectively referred to as "predictive analytical algorithms 816"), respectively, and machine learning algorithms 860A-1, 860A-2, 860A-3, and 860A-4 (hereinafter, collectively referred to as "ML algorithms 860A"), respectively. The virtual assistant 820 will provide auto-suggestions based on the data presented on the GUI to provide proactive assistance in how to perform corrections. In some cases where applicable the virtual assistant will also make required corrections as it develops as a "smart assistant" based on the amount of loans processed through the platform. The virtual assistant is also in a continuous listening mode and will pop-up (by default) as the user makes corrections to the data presented on the GUI. The business rules 814 can be determined by predetermined validation rules (ex. MISMO, lender business rules) or can be created through learned information using historical data, secondary market investor feedback, or from ML algorithms on successful cases. Business rules 814 may include different types, e.g., validation, decision, informational (e.g., historical data may show a similar property lead to some decision that could influence a current decision), conditional (e.g., in the presence of facts A, B, and C, then request information D and/or E, or do not request information F, an d the like). Loan services 880A may store and retrieve data from databases 822-1, 822-2, 822-3, and 822-4 (hereinafter, collectively referred to as "databases 822"), respectively.

ML algorithms 860A may include a Natural language generation/procession (NLG) technology using a 3-layered neural network (Layer 1-Relu, Layer 2-Relu, Layer 3-Sigmoid). In some embodiments, virtual assistants 820 can be trained to support lender 801 or underwriter 805, and provide a number of capabilities to the user such as allowing a self-service "exception" resolution functionality by providing clear and detailed instructions to clear the exception (cf. exceptions 315), and enabling lender 801 or underwriter 805 to receive key information and metrics. Some of the information and metrics may include a total number of mortgage loans that lender 801 has completed in a given month; the average time to close a loan for a specific period of time; the latest mortgage rates; and user behaviors to identify areas where straight through processing rates could be improved. More specifically, ML algorithms 860A run predictive modeling on available historical data; prepare appropriate business rules 814 to fire based on the predictive match with loan application; provide lender 801 and underwriter 805 with information, decisions, and corrective actions on loan applications; and drive the behavior of virtual assistants 820.

An ML algorithm 860B may start with a borrower 803 uploading documentation to a loan origination system (LOS) 865 (e.g., paystubs, W-2 forms, bank statements, investment assets, and the like.) LOS 865 copies the uploaded files to a shared location 867. Hereinafter, ML algorithms 860A and 860B will be collectively referred to as "ML algorithms 860." In general, ML algorithms 860 may include supervised or unsupervised neural network algorithms as described herein.

Step 862 includes, extracting data from the documents provided by borrower 803. In some embodiments, step 862 includes accessing a data stream from shared location 867 where the uploaded files are stored.

Step 864 includes, training the ML algorithm for data extraction from physical documents. In some embodiments, step 864 includes identifying a type of file uploaded by borrower 803 based on the file format. In some embodiments, step 864 may include ML and natural language processing (NLP) to identify the type of document uploaded by borrower 803.

Step 866 includes, performing calculation based on extracted data. For example, calculating an asset and income for borrower 803 based on the extracted data.

Step 868 includes receiving extracted data based on loan parameters. In some embodiments, step 868 further includes providing the extracted data to a validating service (e.g., asset validation service 880B-1, employment validation service 880B-2, and income validation service 880B-3, hereinafter, collectively referred to as "validation services 880B").

ML algorithms 860A and 860B (hereinafter, collectively referred to as "ML algorithms 860") eliminate manual "stare and compare" underwriting, improve overall cycle time by optimizing data extraction over time, provide the underwriter with calculated and validated financial information, and enable early decisions/actions.

Figure 9:
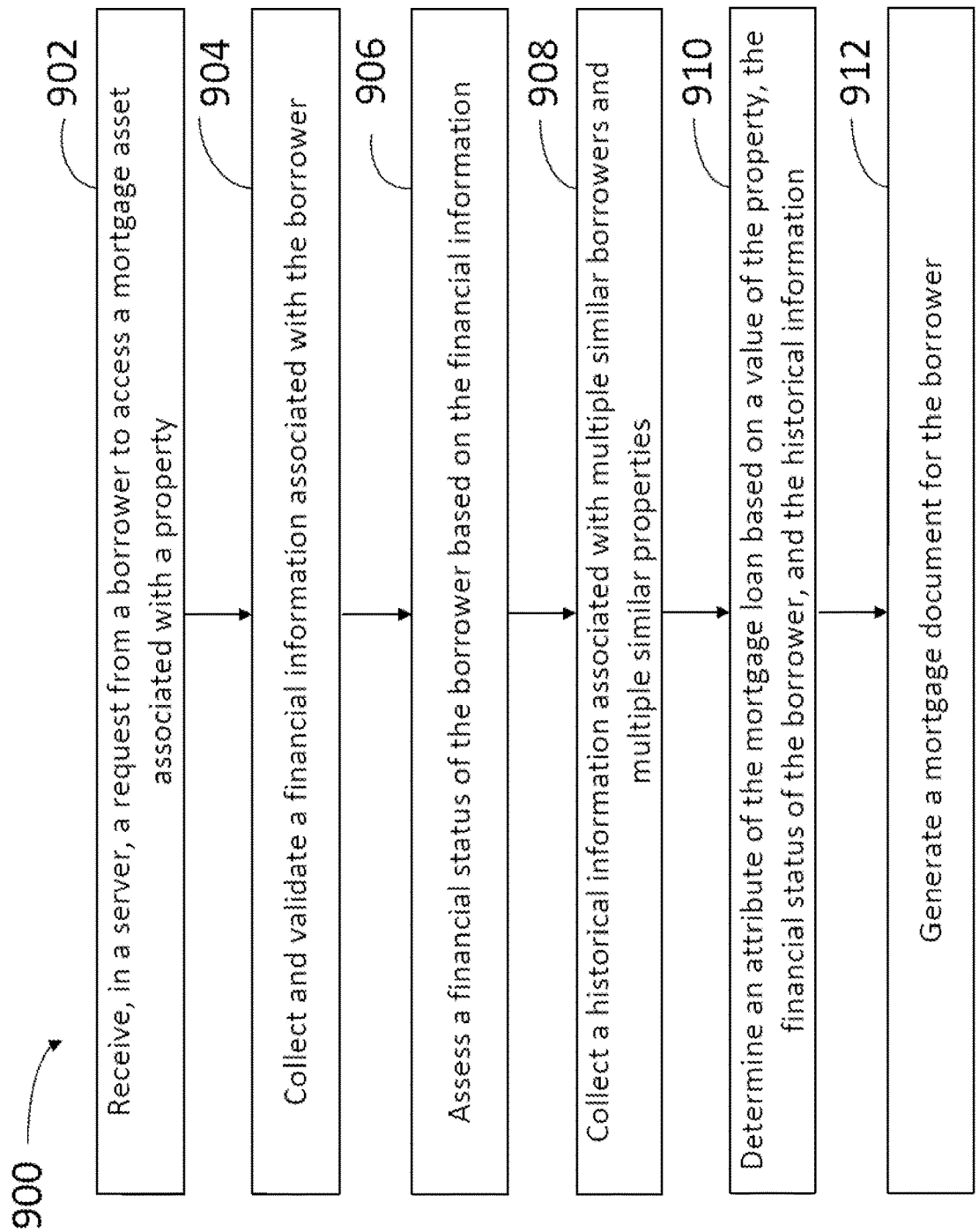
FIG. 9 is a flowchart illustrating steps in a method for generating a mortgage in a real estate exchange system, according to some embodiments.

FIG. 9 is a flow chart including steps in a method 900 for originating and delivering a mortgage asset to a secondary market, according to some embodiments. In some embodiments, a borrower has selected a property for purchase or wants to refinance their current mortgage, and contacts a bank or other financial provider to request a mortgage product. The lender then performs a method as disclosed herein. Method 900 may be performed by a processor executing instructions in a memory or database, from a computer that is part of a server or a client device communicatively coupled with one another via a network, as disclosed herein (e.g., servers 130 and 230, client devices 110, mortgage analytical engine 112, databases 122, and network 150). In some embodiments, at least one of the steps in method 900 may be partially or totally performed by a worker node, in a private or public deployment, according to an API server in an agent cluster (e.g., worker nodes 215, private deployment 221A, public deployment 221B, API servers 233, and agent clusters 213). In some embodiments, one or more steps in method 900 may be performed by an inspection tool running an application installed therein (e.g., inspection tool 710 and application 722). Moreover, some of the results and steps in method 900 may be displayed to a user via a portal and screenshots as disclosed herein (e.g., dashboard 150, 351, 451, 551, and 650, and screenshots 750). Methods consistent with the present disclosure may include at least one or more of the steps in method 900 performed in a different order, simultaneously, quasi-simultaneously, or overlapping in time.

In some embodiments, a borrower in method 900 is associated with a mortgage asset, a mortgage asset may be a digital item, and a property may be an asset associated with the borrower. A financial information and a financial status may be generically understood as personal information and status of the borrower.

Step 902 includes receiving, in a server, a request from a borrower to access a mortgage loan associated with a property. In some embodiments, step 902 includes searching for the financial value of the property in the data lake or from a third party database to identify a value of the property. In some embodiments, step 902 includes receiving, from the borrower or property seller, a media file including a video, an audio, or an image of the property, parsing the media file to extract relevant features of the property, identifying an attribute of the relevant features of the property, and assisting in assessing the value of the property based on a comparison of the attribute of the relevant features of the property with attributes of the relevant feature of a similar property.

Step 904 includes collecting and validating a financial information associated with the borrower. In some embodiments, step 904 includes searching for a borrower information in a third party database. In some embodiments, step 904 includes requesting the financial information from the borrower. In some embodiments, step 904 includes identifying missing data needed for a credit underwriting decision. In some embodiments, step 904 includes processing an exception for missing and/or updated data based on rules set up within the Fx platform, the lender, or a machine learning algorithm in the analytical engine. An example of a rule can be a threshold value. Accordingly, step 904 may include issuing an exception based on financial information or property status information. For example, in some embodiments a "Debt to Income" ratio may be desirably no more than 43% (e.g., rules set up by secondary market investor or any other relevant third party). Accordingly, an AI/ML algorithm in the analytical engine would learn to identify and deal with exceptions before sending to the secondary market investor. Examples of this would be identifying compensating factors in the borrower financial profile such as months of reserve based on their mortgage payment, high credit scores, and low loan to value, to support the acceptance and purchase by the secondary market investors.

Step 906 includes assessing a financial capacity of the borrower to repay based on the borrower information. In some embodiments, step 906 includes identifying a risk associated with the mortgage loan, and selling the mortgage asset to an investor based on the risk. In some embodiments, step 906 may include refusing to provide the mortgage based on the financial status of the borrower and/or recommending actions, such as increasing the amount of down payment or reducing the loan amount requested.

Step 908 includes collecting a historical information associated with multiple similar borrowers and multiple similar properties.

Step 910 includes determining an attribute of the mortgage loan based on a value of the property, the financial capacity of the borrower, and the historical information. In some embodiments, step 910 includes verifying that the mortgage loan satisfies both lender operational and investor business rules.

Step 912 includes generating required mortgage documents for the borrower. In some embodiments, step 912 includes providing required mortgage documents to a lender, and allowing the borrower and the lender to remotely execute the documents via a client device communicatively coupled with the server. In some embodiments, step 912 includes providing the mortgage documents and a risk assessment value to a third party for an insurance evaluation of the mortgage asset. In some embodiments, step 912 includes providing the executed mortgage documents to an investor for funding after the custodian has validated the documents. In some embodiments, step 912 includes generating an ownership title of the property for the borrower when the mortgage documents are executed. In some embodiments, step 912 includes providing to a lender a display of the mortgage asset via a client device. In some embodiments, step 912 includes displaying for a lender the key attributes of the mortgage asset via a client device. In some embodiments, step 912 includes providing the required mortgage documents to a custodian for validation of the mortgage asset.

Figure 10:
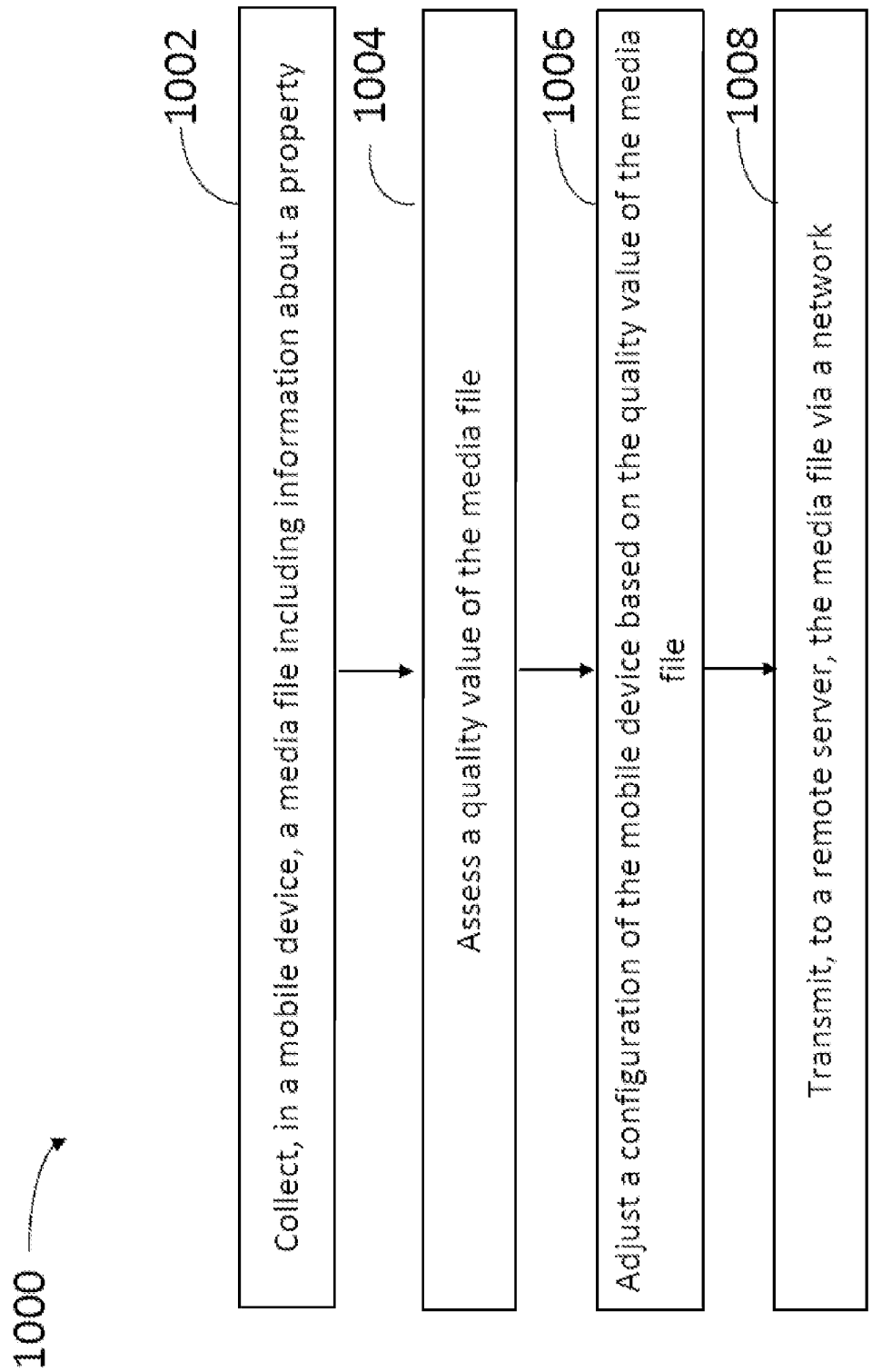
FIG. 10 is a flowchart illustrating steps in a method for performing a virtual inspection of a real estate property in a real estate exchange system, according to some embodiments.

FIG. 10 is a flow chart including steps in a method 1000 for collecting information from a property, according to some embodiments. Method 1000 may be performed via mobile and virtual property inspections to get an appraisal of the property on location by a user (e.g., a homeowner guided by a licensed appraiser, a separate licensed appraiser, and the like). Method 1000 may be performed by a processor executing instructions in a memory or database, from a computer that is part of a server or a client device communicatively coupled with one another via a network, as disclosed herein (e.g., servers 130 and 230, client devices 110, mortgage analytical engine 112, databases 122, and network 150). In some embodiments, at least one of the steps in method 1000 may be partially or totally performed by a worker node, in a private or public deployment, according to an API server in an agent cluster (e.g., worker nodes 215, private deployment 221A, public deployment 221B, API servers 233, and agent clusters 213). In some embodiments, one or more steps in method 1000 may be performed by an inspection tool running an application installed therein (e.g., inspection tool 710 and application 722). Moreover, some of the results and steps in method 1000 may be displayed to a user via a dashboard and screenshots as disclosed herein (e.g., dashboard 150, 351, 451, 551, and 650, and screenshots 750). Methods consistent with the present disclosure may include at least one or more of the steps in method 1000 performed in a different order, simultaneously, quasi-simultaneously, or overlapping in time.

In some embodiments, a borrower in method 1000 may be a user of a mobile device, a mortgage asset may be a digital item, and a property may be an asset associated with the user of the mobile device. A financial information and a financial status may be generically understood as personal information and status of the user of the mobile device.

Step 1002 includes collecting, in a mobile device, a media file including information about a property. In some embodiments, step 1002 includes collecting the media file and includes capturing a video of an interior portion and/or an exterior portion of the property. In some embodiments, step 1002 includes assessing an interior dimension or an exterior dimension of the property based on the media file. In some embodiments, step 1002 includes remotely controlling the drone to capture desirable image shots of the property.

Step 1004 includes assessing a quality value of the media file. For example, in some embodiments a video or a picture or screenshot taken at the property may not properly capture the desired information, or may not have the appropriate focus or clarity to make an assessment based on the media file. Accordingly, step 1004 may include providing feedback to the user of the mobile device to repeat the capture in step 1002, or better adjust a device setting in the mobile device.

Step 1006 includes adjusting a configuration of the mobile device based on the quality value of the media file. In some embodiments, adjusting a configuration includes modifying the camera settings for a video collection, or a picture collection (e.g., zoom, panning, field of view, brightness, contrast, and the like). In some embodiments, step 1006 includes identifying topographical capabilities to provide a height, a depth and other relative positioning of the property in an urban or geographic environment. In some embodiments, step 1006 includes evaluating a comparable property with a machine learning algorithm to determine a property value.

Step 1008 includes transmitting, to a remote server, the media file via a network.

Hardware Overview

Figure 11:
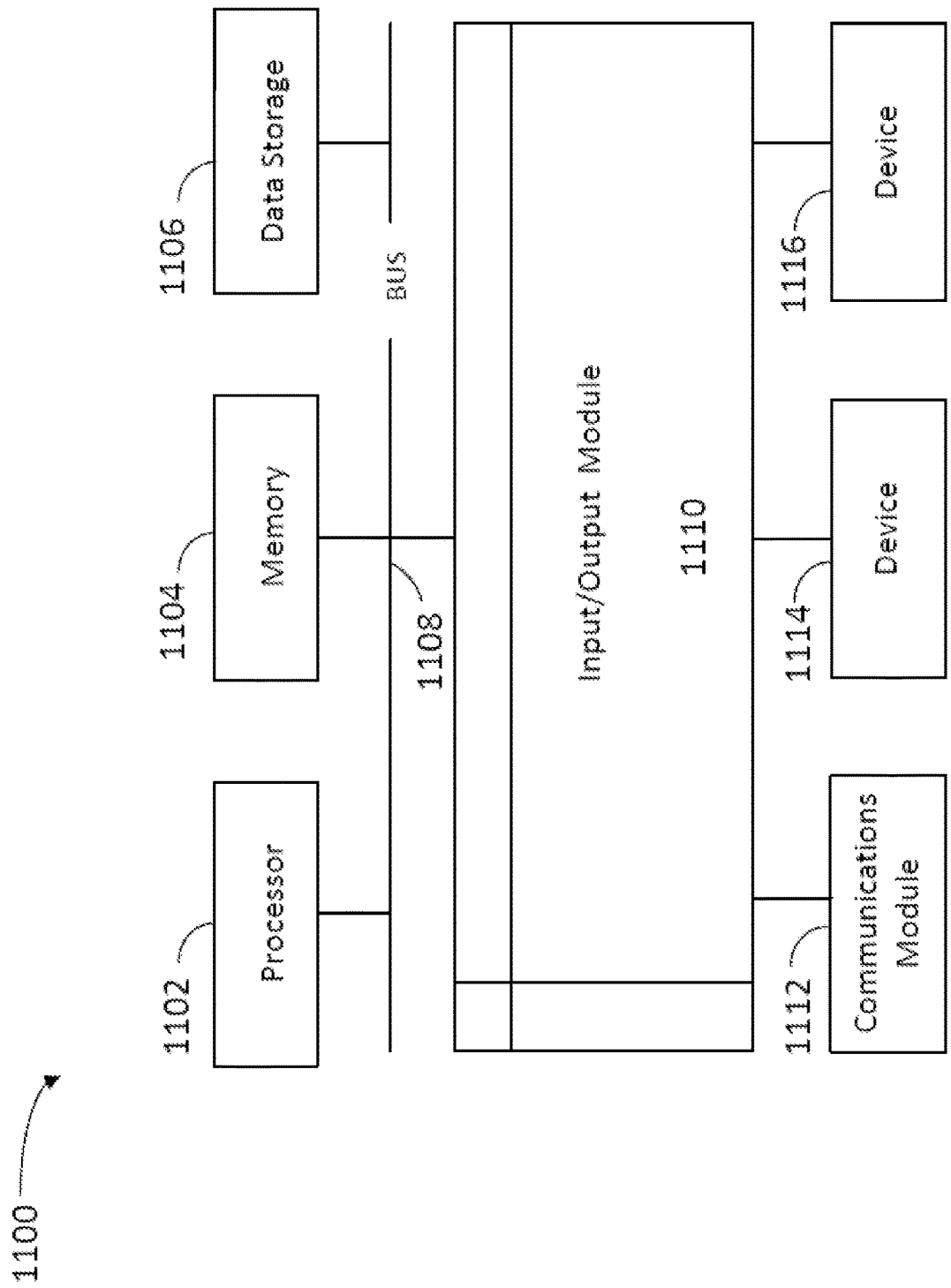
FIG. 11 is a block diagram illustrating an exemplary computer system with which the architecture of FIGS. 1 and 2A-2B, and the methods of FIGS. 8-10 can be implemented.

FIG. 11 is a block diagram illustrating an exemplary computer system 1100 with which the client device 110 and server 130 of FIGS. 1 and 2, and the methods of FIGS. 8B through 10 can be implemented. In certain aspects, the computer system 1100 may be implemented using hardware or a combination of software and hardware, either in a dedicated server, or integrated into another entity, or distributed across multiple entities.

Computer system 1100 (e.g., client device 110 and server 130) includes a bus 1108 or other communication mechanism for communicating information, and a processor 1102 coupled with bus 1108 for processing information. By way of example, the computer system 1100 may be implemented with one or more processors 1102. Processor 1102 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1100 can include, in addition to hardware, code that creates an execution environment for the computer program in question, e.g., code that constitutes processor firmware, a protocol stack, a database management system, an operating system, or a combination of one or more of them stored in an included memory 1104, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 1108 for storing information and instructions to be executed by processor 1102. The processor 1102 and the memory 1104 can be supplemented by, or incorporated in, special purpose logic circuitry.

The instructions may be stored in the memory 1104 and implemented in one or more computer program products, e.g., one or more modules of computer program instructions encoded on a computer-readable medium for execution by, or to control the operation of, the computer system 1100, and according to any method well known to those of skill in the art, including, but not limited to, computer languages such as data-oriented languages (e.g., SQL, dB ase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1104 may also be used for storing temporary variable or other intermediate information during execution of instructions to be executed by processor 1102.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and inter coupled by a communication network. The processes and logic flows described in this specification can be performed by one or more programmable processors executing one or more computer programs to perform functions by operating on input data and generating output.

Computer system 1100 further includes a data storage device 1106 such as a magnetic disk or optical disk, coupled with bus 1108 for storing information and instructions. Computer system 1100 may be coupled via input/output module 1110 to various devices. Input/output module 1110 can be any input/output module. Exemplary input/output modules 1110 include data ports such as USB ports. The input/output module 1110 is configured to connect to a communications module 1112. Exemplary communications modules 1112 include networking interface cards, such as Ethernet cards and modems. In certain aspects, input/output module 1110 is configured to connect to a plurality of devices, such as an input device 1114 and/or an output device 1116. Exemplary input devices 1114 include a keyboard and a pointing device, e.g., a mouse or a trackball, by which a consumer can provide input to the computer system 1100. Other kinds of input devices 1114 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 1116 include display devices, such as an LCD (liquid crystal display) monitor, for displaying information to the consumer.

According to one aspect of the present disclosure, the client device 110 and server 130 can be implemented using a computer system 1100 in response to processor 1102 executing one or more sequences of one or more instructions contained in memory 1104. Such instructions may be read into memory 1104 from another machine-readable medium, such as data storage device 1106. Execution of the sequences of instructions contained in main memory 1104 causes processor 1102 to perform the process steps described herein. One or more processors in a multi-processing arrangement may also be employed to execute the sequences of instructions contained in memory 1104. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be inter coupled by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1100 can include clients and servers. A client and server are generally remote from each other and typically interact through a communication network. The relationship of client and server arises by virtue of computer programs running on the respective computers and having a client-server relationship to each other. Computer system 1100 can be, for example, and without limitation, a desktop computer, laptop computer, or tablet computer. Computer system 1100 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1102 for execution. Such a medium may take many forms, including, but not limited to, non-volatile media, volatile media, and transmission media. Non-volatile media include, for example, optical or magnetic disks, such as data storage device 1106. Volatile media include dynamic memory, such as memory 1104. Transmission media include coaxial cables, copper wire, and fiber optics, including the wires forming bus 1108. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
   receiving, in a server, a request from a client device via a platform to access a digital item associated with an asset;
   collecting a personal information of a user associated with the asset, wherein collecting the personal information comprises searching for a first user information from a third party database, and requesting a second user information from the user;
   assessing a status of the user based on the personal information;
   evaluating a capacity of the user to repay the digital item based on validated data from one or more external data sources;
   collecting a historical information associated with multiple similar users and multiple similar assets;
   searching for a value of the asset in a network;

determining an attribute of the digital item based on the value of the asset, the status of the user, and the historical information, the attribute including an exception generated based on rules set within the platform, wherein the rules are updated based on approval data of investors and/or lenders;

generating a decision to approve the request or reject the request using on a machine learning (ML) model trained based on the capacity of the user to repay the digital item, the historical information, and the attribute;

generating a document for the user for processing the digital item based on the decision to approve the request, and further:

transmitting the document to the client device, wherein the user is provided access to the document via the platform to be executed and a lender is provided access to the document via the platform for review and/or distribution, and refusing access to the digital item based on the decision to reject the request, and further:

identifying a recommended action based on an aspect of the digital item determined to contribute to a rejection of the request;

executing the recommended action to modify at least a portion of the digital item and generate a second digital item; and transmitting the second digital item to the client device, wherein the user is provided access to the second digital item via the platform.

2. The computer-implemented method of claim 1, further comprising:

receiving, from the user, a media file including a video, an audio, or an image of the asset;

parsing the media file to extract a relevant feature of the asset;

identifying an attribute of the relevant feature of the asset; and assessing the value of the asset based on a comparison of the attribute of the relevant feature of the asset with an attribute of the relevant feature of a similar asset.

3. The computer-implemented method of claim 1, further comprising identifying a risk factor associated with the digital item, and providing the digital item to a third party based on the risk factor.

4. The computer-implemented method of claim 1, further comprising at least one of:

providing the digital item and a risk assessment value to a third party for an insurance evaluation of the digital item; and providing the digital item to a government sponsored enterprise for funding.

5. The computer-implemented method of claim 1, further comprising:

identifying an exception to the digital item based on the status of the user; and processing the exception for the user when the status of the user is below a pre-selected threshold value.

6. The computer-implemented method of claim 1, further comprising providing the digital item to a custodian for validation of the digital item.

7. The computer-implemented method of claim 1, further comprising providing to a lender a display of the digital item via the client device.

8. The computer-implemented method of claim 1, further comprising displaying for a lender the attribute of the digital item via the client device.

9. The computer-implemented method of claim 1, wherein determining an attribute of the digital item based on a value of the asset comprises managing an exception queue with a machine learning algorithm to provide a fast track process for a loan.

10. The computer-implemented method of claim 1, further comprising modifying, with a machine learning algorithm, a loan processing based on approval/rejection of the loan.

11. A system, comprising: one or more processors; and
a memory storing instructions which, when executed by the one or more processors, cause the system to perform operations, comprising:

receiving, in a server, a request from a client device via a platform to access a digital item associated with an asset;

collecting a personal information of a user associated with the asset, to collect a personal information associated with the user the one or more processors execute instructions to search for a first user information from a third party database, and to request a second user information from the user;

assessing a status of the user based on the personal information;

evaluating a capacity of the user to repay the digital item based on validated data from one or more external data sources;

collecting a historical information associated with multiple similar users and multiple similar assets;

searching for a value of the asset in a network;

determining an attribute of the digital item based on the value of the asset, the status of the user, and the historical information, the attribute including an exception generated based on rules set within the platform, wherein the rules are updated based on approval data of investors and/or lenders;

generating a decision to approve the request or reject the request using a machine learning (ML) model trained based on the capacity of the user to repay the digital item and the historical information, and the attribute;

generating a document for the user for processing the digital item based on the decision to approve the request, and further:

transmitting the document to the client device, wherein the user is provided access to the document via the platform to be executed and a lender is provided access to the document via the platform for review and/or distribution, and refusing access to the digital item based on the decision to reject the request, and further:

identifying a recommended action based on an aspect of the digital item determined to contribute to a rejection of the request;

executing the recommended action to modify at least a portion of the digital item and generate a second digital item; and transmitting the second digital item to the client device, wherein the user is provided access to the second digital item via the platform.

12. The system of claim 11, wherein to collect a personal information associated with the user, the one or more processors execute instructions to search for a user information in a third party database.

13. The system of claim 11, wherein the one or more processors execute instructions to provide the digital item and a risk assessment value to a third party for an insurance evaluation of the digital item.

14. The system of claim 11, wherein the one or more processors execute instructions to:
   identify an exception to the digital item when the status of the user is below a preselected threshold value.

15. The system of claim 11, wherein to determine an attribute of the digital item the one or more processors execute instructions to verify that the digital item satisfies a business rule.

\* \* \* \* \*